US011505281B2

(12) United States Patent
Langaas et al.

(10) Patent No.: US 11,505,281 B2
(45) Date of Patent: *Nov. 22, 2022

(54) REAR SUSPENSION SYSTEM FOR A SNOWMOBILE

(71) Applicant: Arctic Cat Inc., Thief River Falls, MN (US)

(72) Inventors: Benjamin Taylor Langaas, Thief River Falls, MN (US); Brian W. Dick, Thief River Falls, MN (US)

(73) Assignee: ARCTIC CAT INC., Thief River Falls, MN (US)

(*) Notice: Subject to any disclaimer, the term of this patent is extended or adjusted under 35 U.S.C. 154(b) by 170 days.

This patent is subject to a terminal disclaimer.

(21) Appl. No.: 16/789,919

(22) Filed: Feb. 13, 2020

(65) Prior Publication Data

US 2020/0255091 A1 Aug. 13, 2020

Related U.S. Application Data

(60) Provisional application No. 62/805,062, filed on Feb. 13, 2019.

(51) Int. Cl.
*B62M 27/02* (2006.01)
*B62D 55/108* (2006.01)

(52) U.S. Cl.
CPC ....... *B62M 27/02* (2013.01); *B62M 2027/025* (2013.01); *B62M 2027/026* (2013.01)

(58) Field of Classification Search
CPC ............ B62M 27/02; B62M 2027/026; B62M 2027/027; B62M 55/108; B62B 55/07; B62B 55/108; B62D 55/07; B62D 55/108

USPC ........ 305/127, 128, 130, 141, 142; 267/242, 267/233, 234, 247
See application file for complete search history.

(56) References Cited

U.S. PATENT DOCUMENTS

| | | | | |
|---|---|---|---|---|
| 2,791,419 A * | 5/1957 | Whalen | ..................... | B60G 7/04 267/45 |
| 3,312,459 A * | 4/1967 | Pence | ..................... | B60G 7/04 267/45 |
| 3,620,318 A * | 11/1971 | Gostomski | ............. | B62D 55/30 180/9.1 |
| 3,727,709 A * | 4/1973 | Newman | ................ | B62M 27/02 180/9.58 |
| 3,756,667 A * | 9/1973 | Bombardier | ........... | B62M 27/02 305/127 |
| 3,900,357 A * | 8/1975 | Huchette | ............... | B29C 70/865 156/185 |
| 5,667,031 A * | 9/1997 | Karpik | .................... | B62M 27/02 180/190 |
| 6,012,709 A * | 1/2000 | Meatto | ................. | B60G 17/023 267/47 |
| 6,450,279 B1 * | 9/2002 | Imamura | ................ | B62M 27/02 180/193 |
| 6,688,586 B1 * | 2/2004 | Moore | ..................... | B60G 3/28 267/230 |

(Continued)

*Primary Examiner* — Anne Marie M Boehler
(74) *Attorney, Agent, or Firm* — Billion & Armitage

(57) ABSTRACT

A snowmobile includes a chassis, at least one ski steerably secured to a front of the chassis, and a skid frame having a rear suspension and one or more slide rails. The rear suspension includes a flexible, composite member affixed on a first end to the one or more slide rails and on a second end to the chassis, wherein the flexible, composite member includes a main body and a secondary body.

14 Claims, 38 Drawing Sheets

(56) References Cited

U.S. PATENT DOCUMENTS

| | | | |
|---|---|---|---|
| 6,976,689 B2 * | 12/2005 | Hibbert | B60G 21/06 |
| | | | 280/124.159 |
| 8,733,490 B2 * | 5/2014 | Beavis | B62D 55/14 |
| | | | 180/190 |
| 9,090,297 B2 | 7/2015 | Mallette | |
| 9,597,938 B2 * | 3/2017 | Spiegel | F16F 1/368 |
| 10,065,708 B2 | 9/2018 | Labbe et al. | |
| RE47,113 E | 11/2018 | Mallette | |
| 2003/0178756 A1 * | 9/2003 | Meatto | F16F 1/368 |
| | | | 267/148 |
| 2017/0057573 A1 * | 3/2017 | Gentry | B62D 55/108 |

* cited by examiner

REAR SUSPENSION SYSTEM FOR A SNOWMOBILE

CROSS REFERENCE

This application claims the benefit of and priority to U.S. provisional application 62/805,062, titled "REAR SUSPENSION SYSTEM FOR A SNOWMOBILE", filed Feb. 13, 2019, the contents of which are incorporated by reference herein. The present application is related to co-pending application Ser. No. 16/789,949 filed on the same date as the present application and titled "REAR SUSPENSION SYSTEM FOR A SNOWMOBILE". This application is incorporated herein by reference.

TECHNICAL FIELD

The invention relates generally to snowmobiles and, in particular, to a rear suspension system for snowmobiles.

BACKGROUND

A typical snowmobile includes a chassis, an engine, a drive track, a drive train, and a suspension. The suspension includes two separate systems, a front suspension system for the skis and a rear suspension system for the track.

The rear suspension of a snowmobile supports an endless track driven by the snowmobile engine to propel the machine. The track is supported beneath the vehicle chassis by a rear suspension that is designed to provide proper weight balance and ride comfort by absorbing some of shock as the snowmobile traverses the terrain. Most modern snowmobiles utilize a slide rail suspension which incorporates a slide rail along with several idler wheels to support the track. The slide rail typically is suspended beneath the chassis by two or more suspension arms, each arm being attached at its upper end to the chassis of the snowmobile and attached at its lower end to the slide rail. The mechanical linkage of the slide rail to the suspension arms and to the snowmobile chassis typically is provided with springs to urge the slide rails downwardly away from the snowmobile chassis.

It would be beneficial to provide a rear suspension that is lighter and less complex that traditional rear suspension systems, while providing advantages over known systems.

SUMMARY

According to some embodiments, a snowmobile includes a chassis, at least one ski steerably secured to a front portion of the chassis, and a skid frame having a rear suspension and one or more slide rails. The rear suspension includes a flexible, composite member affixed on a first end to the one or more slide rails and on a second end to the chassis, wherein the flexible, composite member includes a main body and a secondary body.

According to some embodiments, a snowmobile includes a chassis, at least one ski steerably secured to a front portion of the chassis, and a skid frame having a rear suspension and one or more slide rails. The rear suspension includes first and second flexible, composite arms affixed on a first end to a lower shackle mount attached to the one or more slide rails and on a second end to the chassis, a middle flexible, composite arm affixed on a first end to the lower shackle mount. A transition assembly is affixed to the middle flexible, composite arm and includes at least a first arm extending underneath one or both of the first and second flexible, composite arms, wherein the transition assembly is configured to engage with the first and second flexible, composite arms during travel of the rear suspension.

According to some embodiments, a snowmobile includes a chassis, at least one ski steerably secured to a front portion of the chassis and a skid frame having a rear suspension and one or more slide rails. In some aspects, the rear suspension includes first and second flexible, composite arms affixed on a first end to a lower shackle mount affixed to the one or more slide rails and on a second end to the chassis, a middle flexible, composite arm affixed on a first end to the lower shackle mount, and a transition assembly affixed to the middle flexible, composite arm and including at least a first tab extending underneath one or both of the first and second flexible, composite arms, wherein the transition assembly is configured to engage with the first and second flexible, composite arms during travel of the rear suspension.

According to some embodiments, a snowmobile includes a chassis, at least one ski steerably secured to a front portion of the chassis, and a skid frame having a rear suspension and one or more slide rails. The rear suspension includes a flexible, composite member, the flexible, composite member having a first end coupled to the chassis and the second end coupled to the one or more slide rails, wherein the flexible, composite member has a non-uniform thickness.

DETAILED DESCRIPTION

Figure 1:
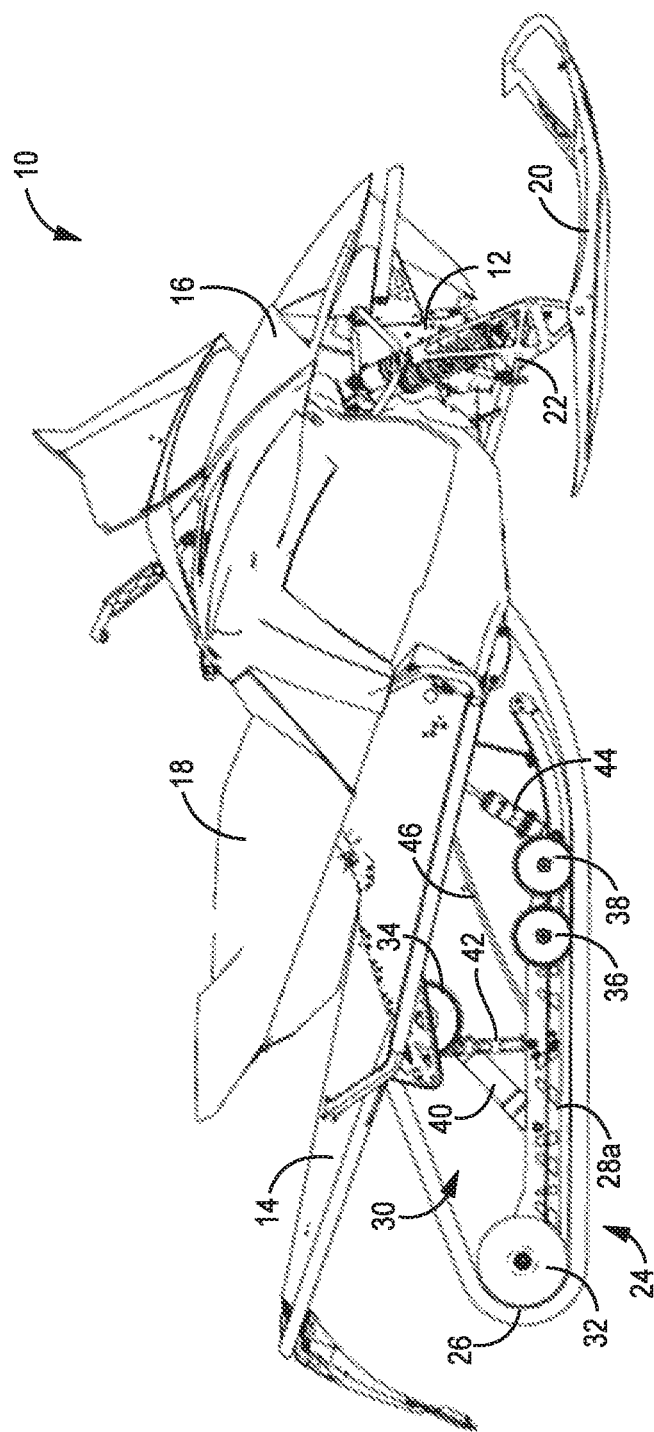
FIG. 1 is a side view of a snowmobile having a rear suspension according to some embodiments.

The present disclosure is directed to a rear suspension system utilized in snowmobiles. The rear suspension includes at least a flexible, composite member that is connected between the chassis and the skid frame. The flexible member controls suspension movement, track tension, and provides a desired spring rate to the rear suspension. In some embodiments, the flexible member includes a main body and a secondary body. During a first length of travel of the rear suspension the spring rate is a function of the main body. During a second length of travel of the rear suspension the spring rate is a function of both the main body and the secondary body thereby providing a second spring rate.

Referring now to FIGS. 1-5, a snowmobile 10 having a skid frame 24 is shown. Those skilled in the art will appreciate the basic construction of a snowmobile 10 as including a chassis 12, a body 16, a seat 18, at least one front ski 20, front suspension 22, an endless track 26 and a skid frame 24 having a rear suspension 30. In some embodiments, the skid frame 24 further includes one or more slide rails 28a, 28b, rear idler wheel 32, upper idler wheel 34, first forward idler wheel 36, and second forward idler wheel 38. In some embodiments, the rear suspension 30 includes rear shock 40, lower shock link 42, forward shock 44, and flexible, composite member 46. The body 16 and seat 18 are secured to the chassis 12 along with other standard or optional components. The one or more skis 20 are secured to the chassis 12 through front suspension 22. The skid frame is attached to the chassis 12 through the rear suspension 30.

Figure 2:
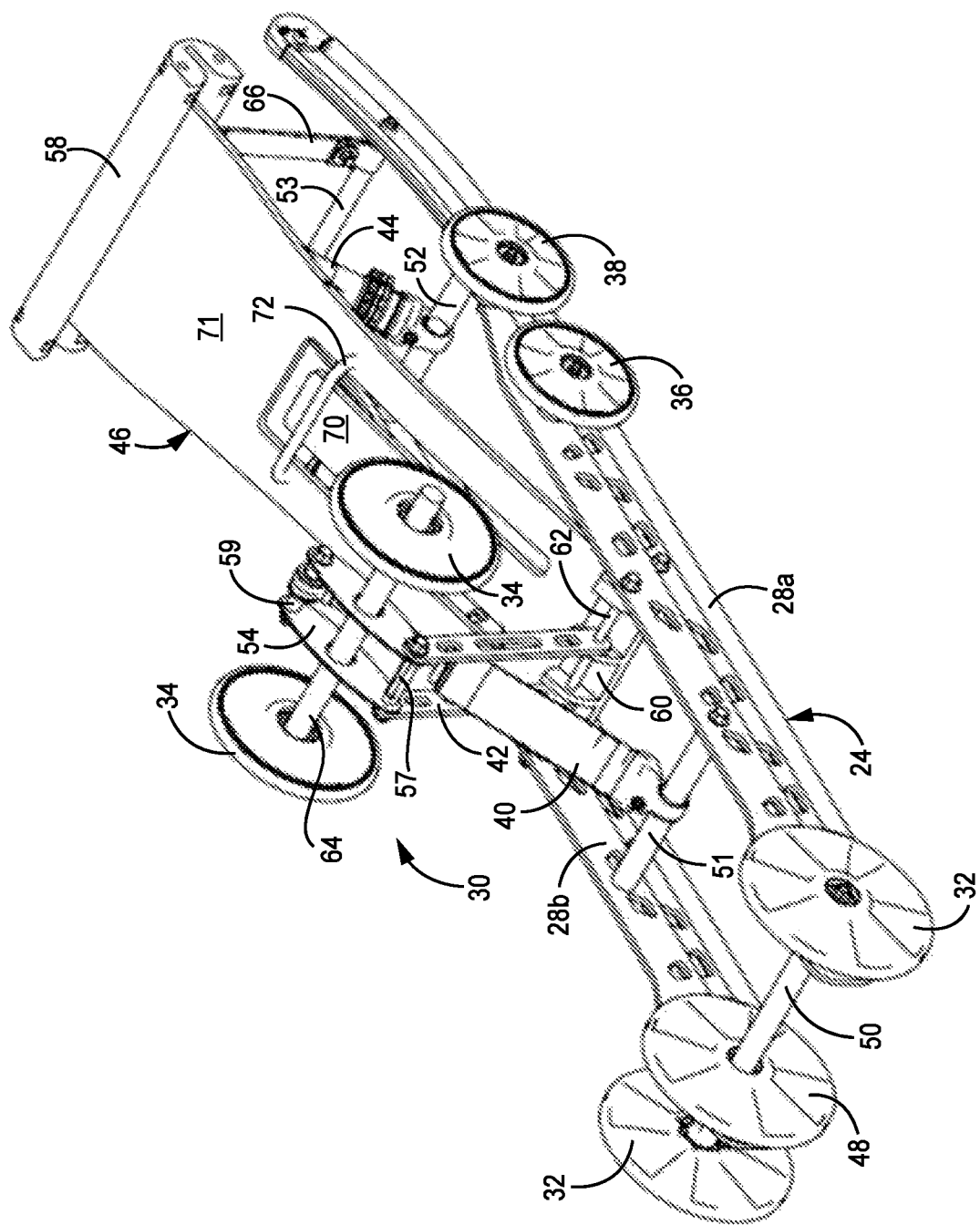
FIG. 2 is an isometric view of the skid frame according to some embodiments.
Figure 3:
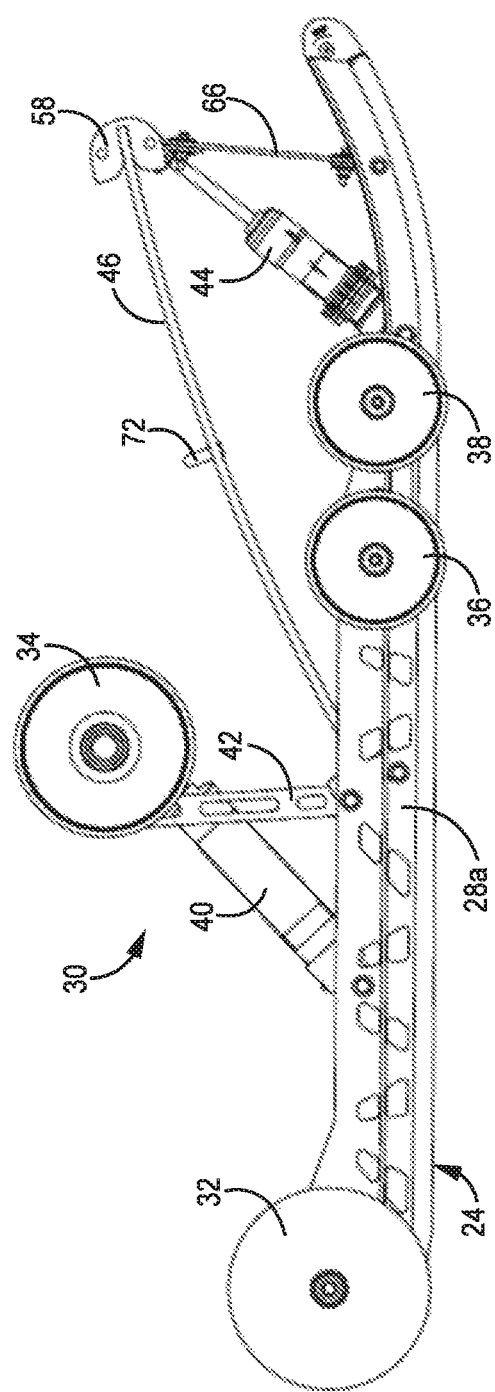
FIG. 3 is a side view of the skid frame according to some embodiments.

In some embodiments, skid frame 24 includes one or more slide rails 28 extending longitudinally along the length of the skid frame 24. In some embodiments, a single slide rail is utilized, centered along the length of skid frame 24. In other embodiments, such as that shown in FIGS. 1-5, a pair of slide rails 28a, 28b extend longitudinally along the length of the skid frame 24, wherein the slide rails 28a, 28b are substantially parallel with one another. As shown in FIG. 2, a plurality of cross-members are connected to the pair of slide rails 28a, 28b, including rear cross member 50, first middle cross member 51, second middle cross member 52, and forward cross member 53. In some embodiments, the plurality of cross-members are coupled to the rails 28. The components of rear suspension 30, including rear shock 40, lower shock link 42, forward shock 44, flexible member 46 and forward strap 66 are secured to the pair of slide rails 28a, 28b or to the respective cross members connected between the rails 28a, 28b. Endless track 26 is slidably engaged with the one or more rails 28a, 28b (e.g., via a wear strip) as well as being engaged with several idler wheels, including rear idler wheel 32, first forward idler wheels 36, second forward idler wheels 38, upper idler wheels 34, and rear middle idler wheels 48. The endless track 26 is driven by a drive sprocket (not shown) located forward of the idler wheels. Rear idler wheels 32 are rotatably secured to the rearward end of slide rails 28a, 28b, along with middle idler wheel 48 pivotally connected to rear cross member 50. Likewise, first forward idler wheels 36 and second forward idler wheels 38 are rotatably connected to slide rails 28a, 28b at a location forward of the rear idler wheels 32.

In some embodiments, upper idler wheels 34 are pivotally connected to upper cross member 64, which is in turn coupled to the chassis 12 and/or frame 14 of the snowmobile 10. Upper shock mount 54 is pivotally connected to upper cross member 64, wherein the upper shock mount 54 includes a rear end connected to rear shock mount cross member 57 and forward end connected to forward shock mount cross member 59. As shown in FIG. 2, rear shock 40 has a first end (a rear, lower end) connected to first middle cross member 51 and a second end (forward, upper end) connected to the upper shock mount 54 via forward shock mount axle 59. As rear shock 40 is compressed upper shock mount 54 rotates about shock mount axle 59, as permitted by lower shock link 42 and rear shock 40.

Figure 5:
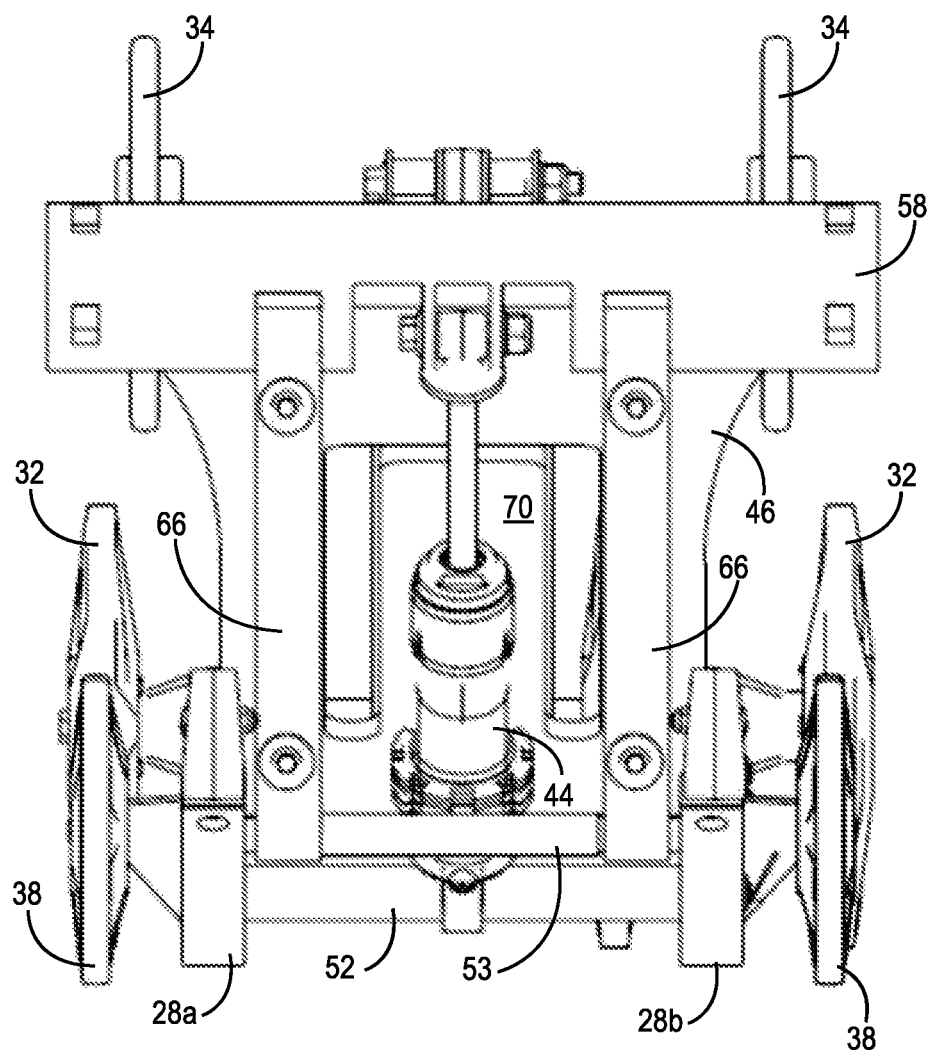
FIG. 5 is a front view of the skid frame according to some embodiments.

In addition to rear shock 40, some embodiments include forward shock 44, which is pivotally connected to second middle cross member 52 at a first end, and pivotally connected to upper shackle mount 58 at a second end (as shown, for example, in FIG. 5). In addition, in some embodiments a forward strap 66 is connected at a first end to the forward cross member 53 (as shown in FIG. 2) and at a second end to the upper shackle mount 58. In some embodiments, forward strap 66 is configured to limit the maximum distance between the slide rails 28a, 28b and the upper shackle mount 58. In some embodiments, rear shock 40, forward shock 44, and forward strap 66 do not support the weight of the snowmobile 10. Rather, the rear and forward shocks 40 and 44 act to dampen movement (e.g., bouncing) of the rear suspension 30. The weight of the snowmobile 10 is supported in the rear suspension 30 by flexible, composite member 46, which provides a spring force that urges the slide rails 28a, 28b downward away from the chassis 12 and into contact with the ground and acts to absorb bumps in the terrain by allowing the skid frame 24 to "travel" relative to the chassis 12. In some embodiments, however, one or both of the rear shock 40 and front shock 44 support at least a portion of the weight of the snowmobile and also provide damping. By way of example, one or both of the rear shock 40 and front shock 44 can include an air shock (e.g., FOX Float QS3). Further, in some embodiments, the rear suspension 30 includes one or more coil springs, which may be used in conjunction with one or more shocks (e.g., reach shock 40, front shock 44) and flexible, composite member 46. Further, in some embodiments—such as that shown in FIG. 31—the rear suspension 30 includes one or more torsion springs 340a, 340b, in addition to one or more shocks, and flexible, composite member 46. As described in more detail with respect to FIGS. 25A-25C and 26A-26C, travel may include travel of the rear portion of the skid frame 24 toward the chassis 12, the forward portion of the skid frame 24 toward the chassis 12, or both the rear and forward portions of skid frame 24 toward the chassis 12.

Figure 4:
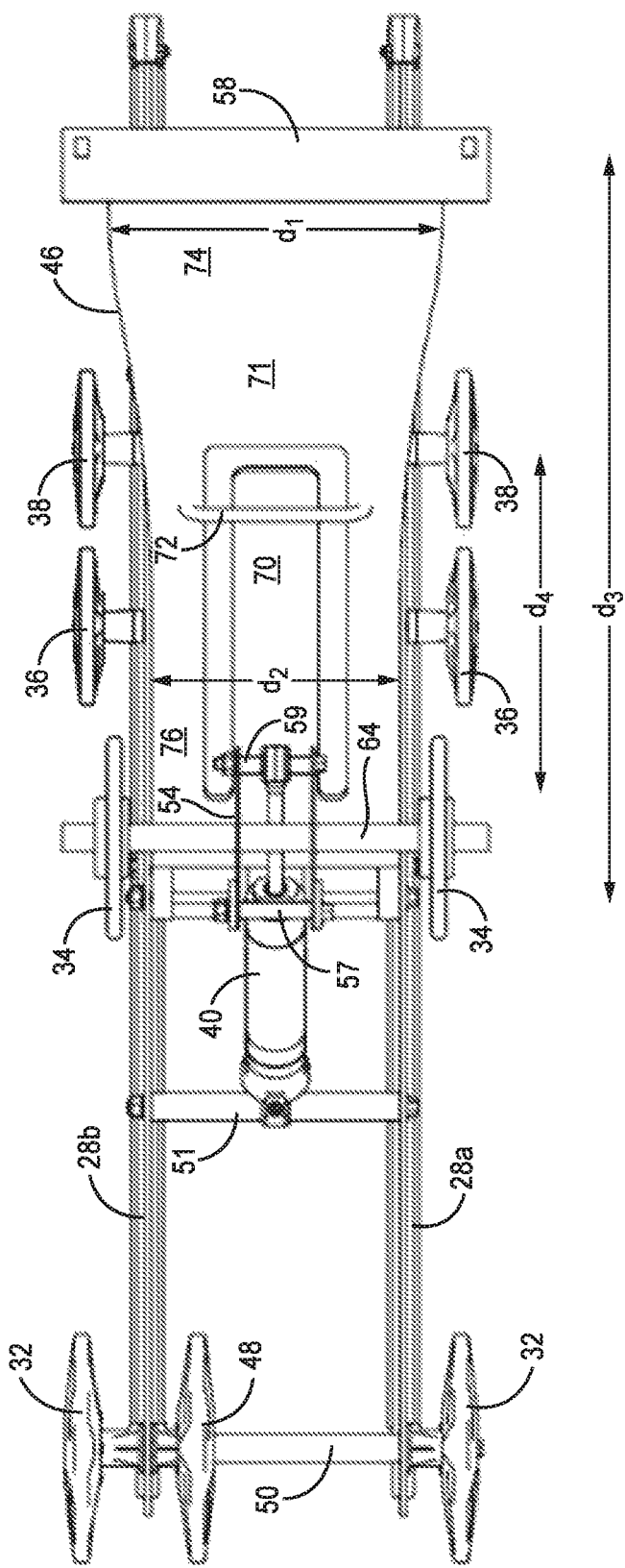
FIG. 4 is a top view of the skid frame according to some embodiments.
Figure 22:
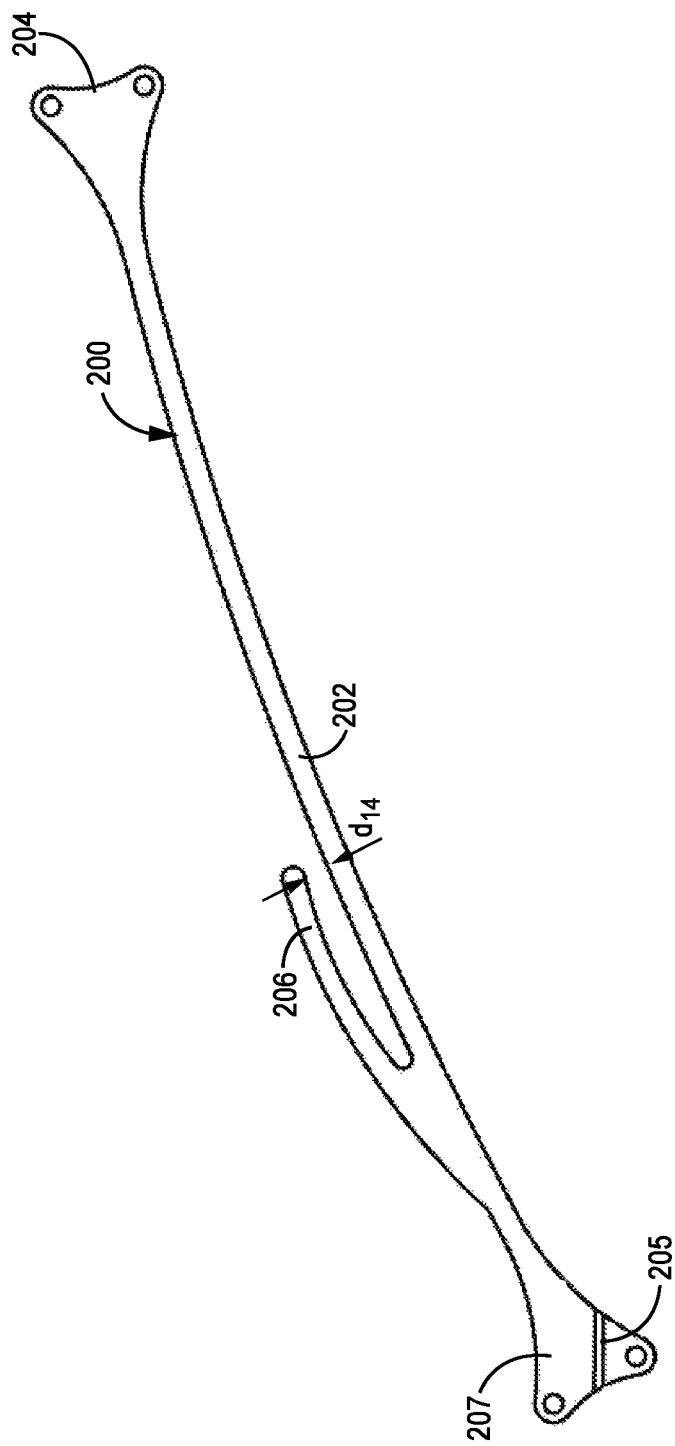
FIG. 22 is a side view of a suspension arm that includes a finger portion utilized to provide dual-rate suspension according to some embodiments.

As shown in FIGS. 1-5, the flexible member 46 is coupled between the one or more slide rails 28a, 28b and the chassis 12. In some embodiments flexible member 46 is coupled at a first end to lower shackle mount 60 and coupled at a second end to upper shackle mount 58. Lower shackle mount 60 is coupled to slide rails 28a, 28b, while upper shackle mount 58 is coupled to the chassis 12. In some embodiments, lower shackle mount 60 is connected to slide rails 28a, 28b. As shown in FIG. 2, upper shackle mount 58 is connected to chassis 12, and in particular to tunnel 14 of chassis 12 In some embodiments, lower shackle mount 60 and/or upper shackle mount 58 are integrally formed as part of flexible member 46 (e.g., as shown in FIG. 22), wherein flexible member 46 is then connected to the slide rails 28a, 28b at a first end and to chassis 12 at a second end. As discussed in more detail below, the composition, shape, and geometry of flexible member 46 is selected to provide the desired spring response between the slide rails 28a, 28b and the chassis 12 of the snowmobile 10, as well as to control suspension movement, control track tension, and provide a desired spring rate (or spring rates) to the rear suspension. In some embodiments, the composition is a polymer composite material that includes a fiber and resin composition selected to provide the desired stiffness, strength, and spring rate (or spring rates). For example, in one embodiment the flexible member is formed from unidirectional glass fibers and an epoxy resin matrix. In some embodiments, the unidirectional glass fibers comprise by volume between 50-70% of the composite structure. In some embodiments, the geometry of the flexible member 46 is defined by a thickness, a width, and a length, wherein one or more of these features is varied across the geometry of the flexible member 46. For example, the thickness of the flexible member 46 may vary over the length and/or width of the flexible member. Likewise, the width of the flexible member 46 may vary over the length of the flexible member (for example, as shown in FIG. 4, in which the forward end of the flexible member has a width $d_1$ that is greater than the width $d_2$ at the rearward end).

Figure 11:
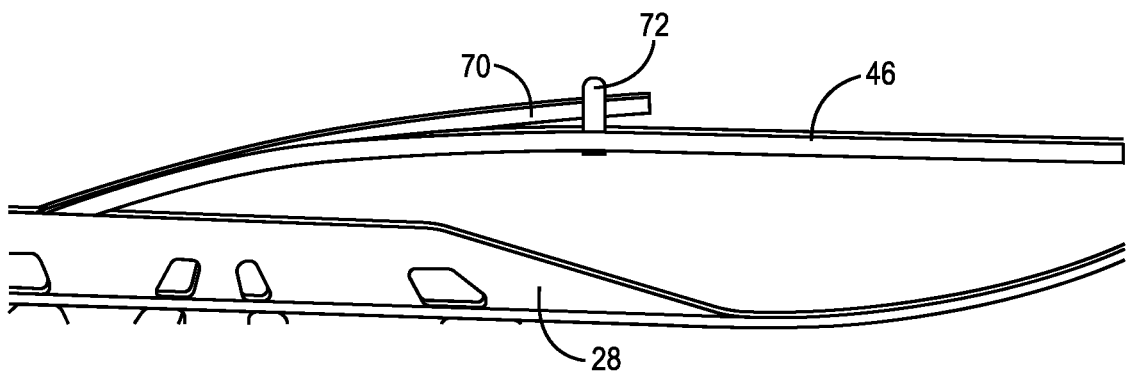
FIG. 11 is a side view of the suspension arm that illustrate the relative movement between the tongue and the suspension arm according to some embodiments.
Figure 12:
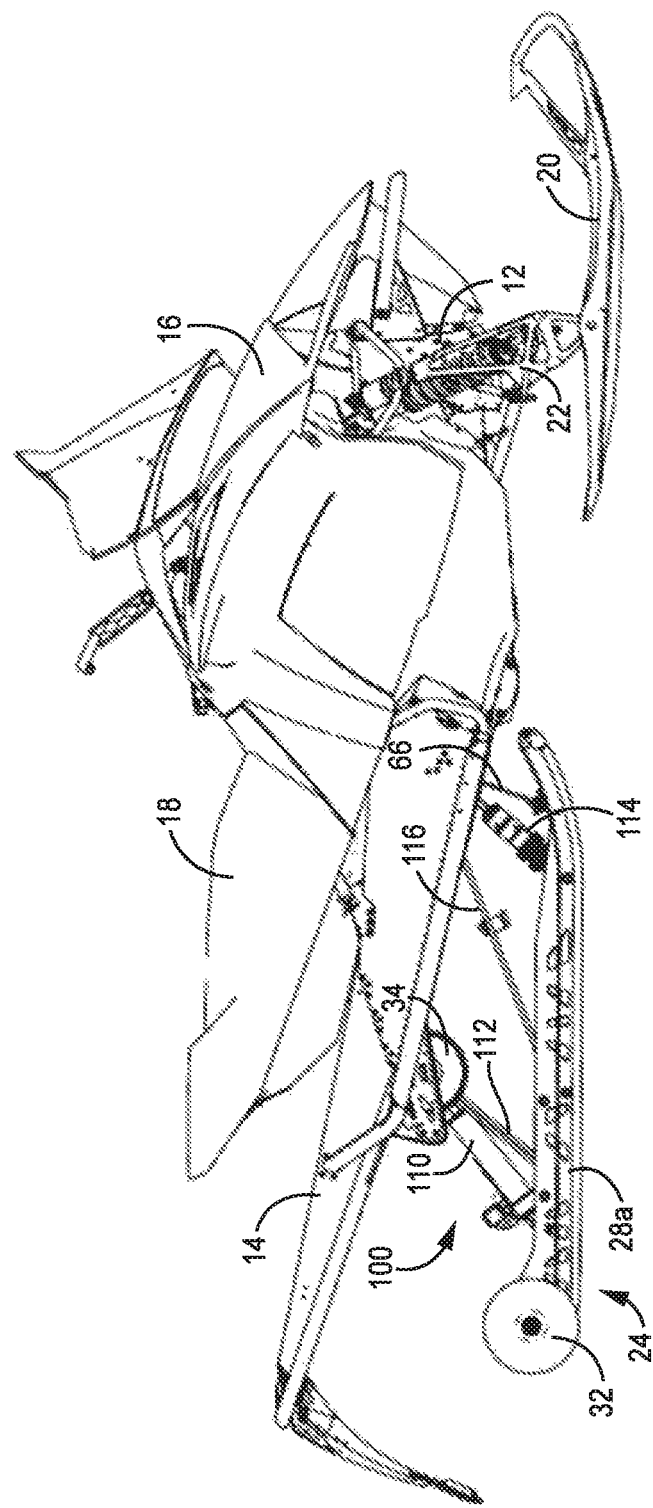
FIG. 12 is a side view of a snowmobile having a skid frame according to some embodiments.
Figure 32A:
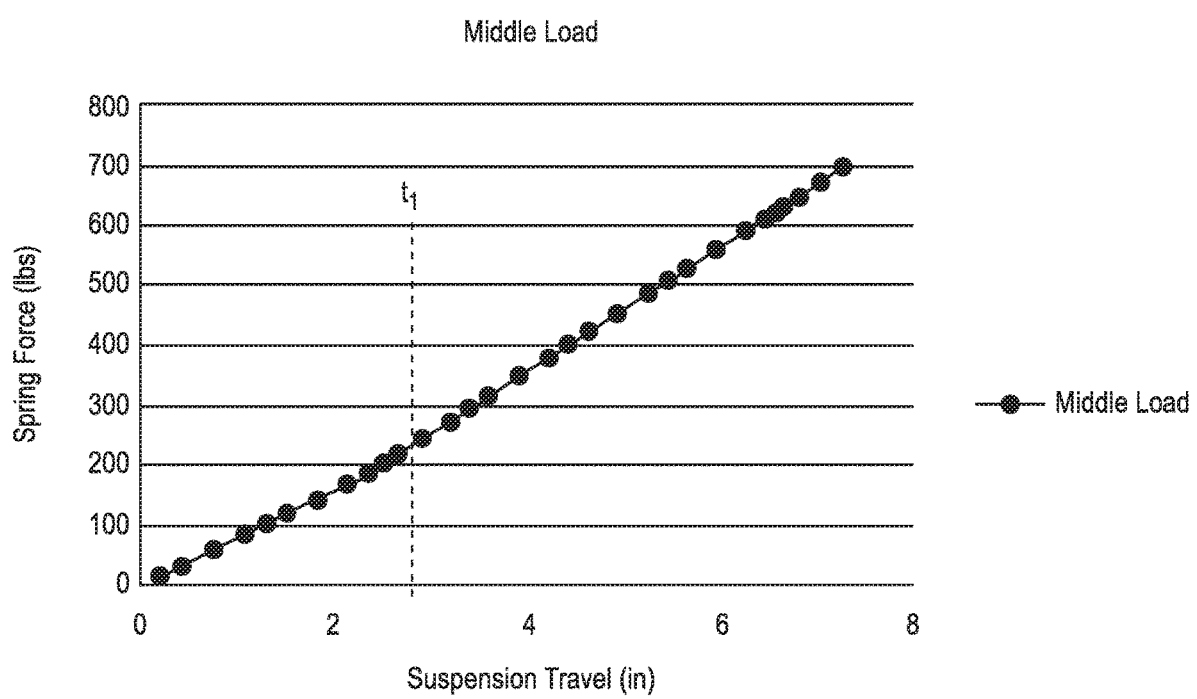
FIGS. 32A-32C are graphs illustrating the relationship between travel of the rear suspension and spring force for loads applied to the middle, front and rear of the rear suspension according to some embodiments.
Figure 32B:
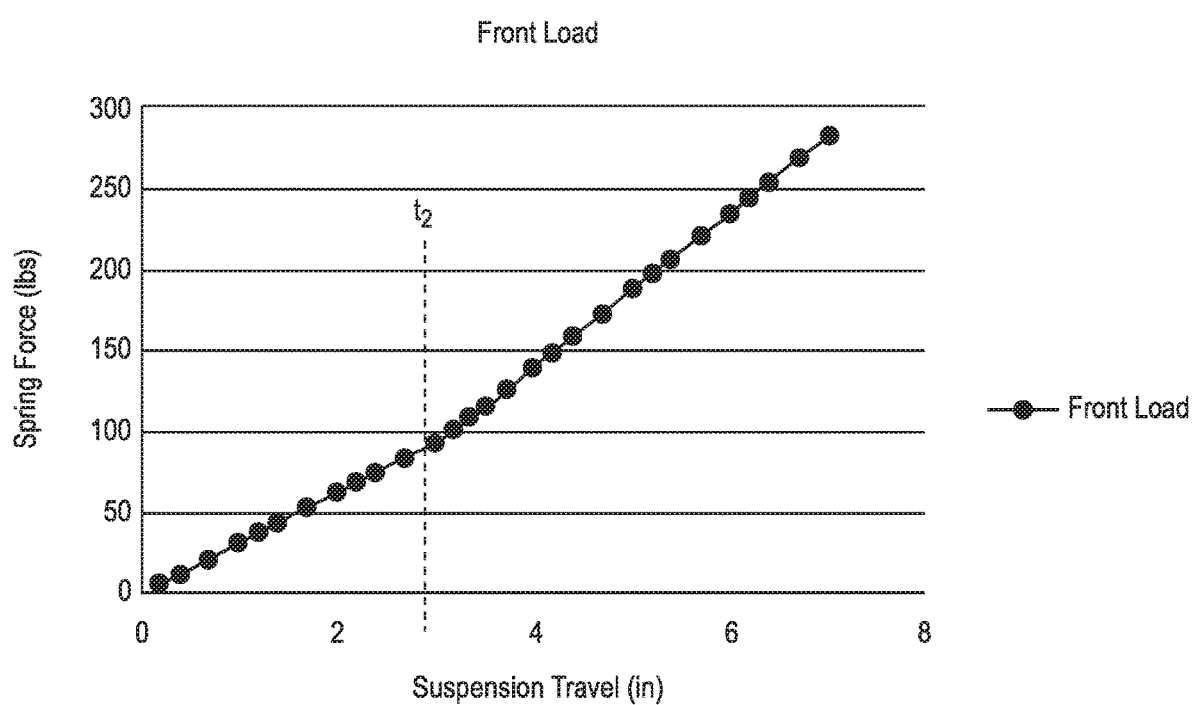
Figure 32C:
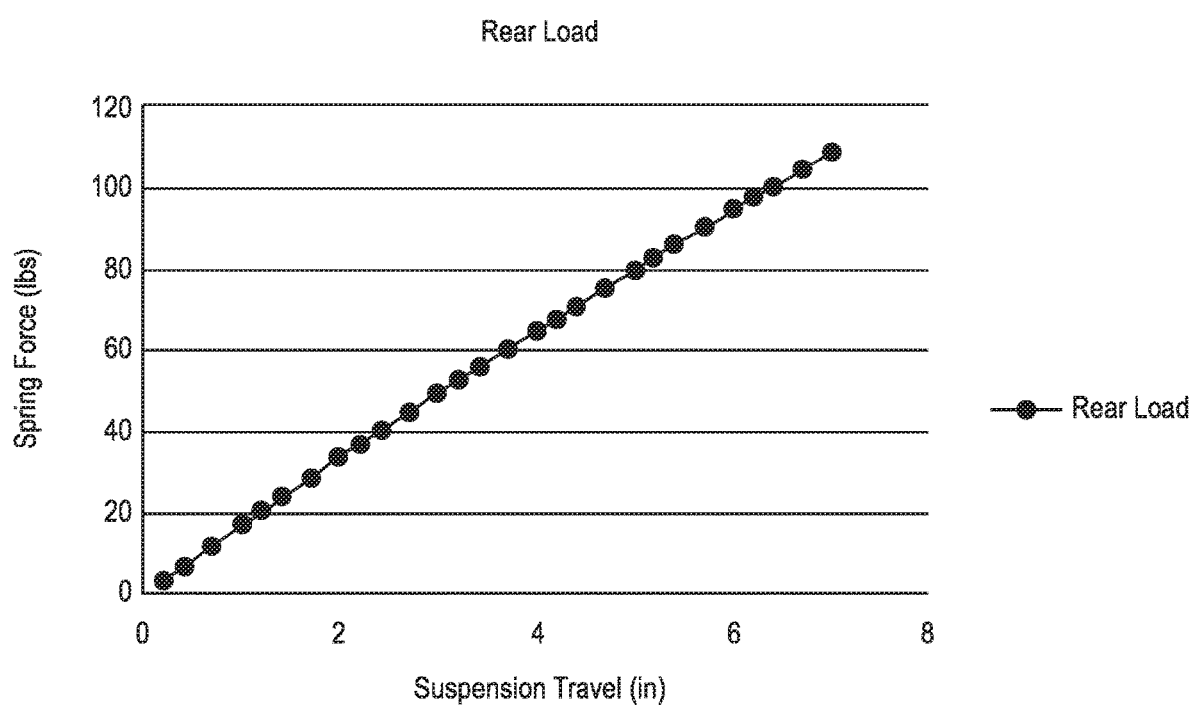

In some embodiments, the flexible member 46 includes one or more features that provide a first spring rate over a first length of travel (e.g., a portion of suspension travel) and at least a second spring rate over a second length of travel (e.g., a portion of suspension travel). For example, in the embodiment shown in FIG. 2, the flexible member 46 includes a tongue 70 formed within a main portion 71 of the flexible member 46. As shown in FIG. 4, tongue 70 is separated from the main portion 71 of flexible member 46 on three sides. In the embodiment shown in FIG. 4, tongue 70 is connected to the main portion 71 on the rear side of tongue 70, but in other embodiments may be connected to the main portion 71 on the forward side of tongue 70. As a result, the main portion 71 of flexible member 46 acts as a spring to resist displacement of the one or more slide rails 28a, 28b, but the tongue 70 does not contribute to the spring rate provided during a first length of travel of the rear suspension 30. As the main portion 71 of flexible member 46 is displaced, a vertical gap is created between the main portion 71 of flexible member 46 and the tongue 70 (as shown in FIG. 11, for example). A transition mechanism 72 is utilized to define the allowed or maximum gap between the main portion 71 and the tongue 70, which in turn determines the distance the rear suspension is allowed to travel before transitioning from the first spring rate to the second spring rate. Subsequent displacement of the flexible member 46 after the transition mechanism 72 is engaged by the tongue 70 is subject to the second spring rate, wherein both the main portion 71 and the tongue 70 contribute to the spring force acting to resist additional displacement of the slide rails 28a, 28b. That is, in some embodiments, during a first length of travel—in which flexible member 46 flexes relatively independently of tongue 70—the flexible member 46 provides a first spring rate. During a second length of travel—in which tongue 70 is engaged by transition mechanism 72 and moves in tandem with the main portion 71—the flexible member 46 provides a second spring rate, wherein the second spring rate is greater than the first spring rate. The position of transition mechanism 72 determines the point at which the flexible member 46 transitions from a first spring rate to a second spring rate. In some embodiments, the flexible member 46 has a variable spring rate (e.g., rising rate) prior to engagement of the tongue 70 with the transition mechanism 72; further in some embodiments, the flexible member 46 has a variable spring rate (e.g., rising rate) after engagement of the tongue 70 with the transition mechanism 72. FIGS. 32A-32C are graphs illustrating exemplary relationships between the spring force (i.e., pounds (lbs.)) shown on the y-axis) and suspension travel in inches (x-axis) measured at the application of force in which the spring force increases throughout travel of the rear suspension. In the embodiment shown in FIGS. 32A-32C is based on a flexible member having a tongue connected to the main portion on a rear side. In particular, FIG. 32A illustrates the relationship between spring force and suspension travel if the load is applied to the middle of the skid frame 24. In some embodiments, the spring force increases approximately linearly at a first rate from zero inches to approximately three inches (labeled $t_1$) and increases approximately linearly at a second rate from approximately three inches to eight inches. In FIG. 32A, travel is measured at the point at which force is applied (e.g., approximately the middle point along skid frame 24). Likewise, FIG. 32B illustrates the relationship between the spring force and suspension travel if the load is applied to the rear of the skid frame 24. The spring force increases approximately linearly at a first rate from zero inches to approximately three inches (labeled $t_2$) and increases approximately linearly at a second rate from approximately three inches to eight inches (once again as measured at the application of force at a rear end of the skid frame 24). FIG. 32C illustrates the relationship between the spring force and suspension travel if the load is applied to the front of the skid frame 24. As shown in FIG. 32C, the spring rate increases approximately linearly throughout the length of travel. In this embodiment, the tongue portion is not engaged, which results in the spring force increasing approximately linearly throughout the length of travel.

In the embodiment shown in FIGS. 1-6 the transition mechanism 72 is a U-shaped bar attached to the main portion of the flexible member 46 and extending over the tongue 70, the height of the U-shaped bar over the tongue 70 determines the transition point of the flexible member 46 from the first spring rate to the second spring rate. In some embodiments, the transition point between the first spring rate and second spring rate is modified by changing the height of the transition mechanism 72. In some embodiments, the second spring rate is modified by changing the position of the transition mechanism along the length of tongue 70.

Figure 6:
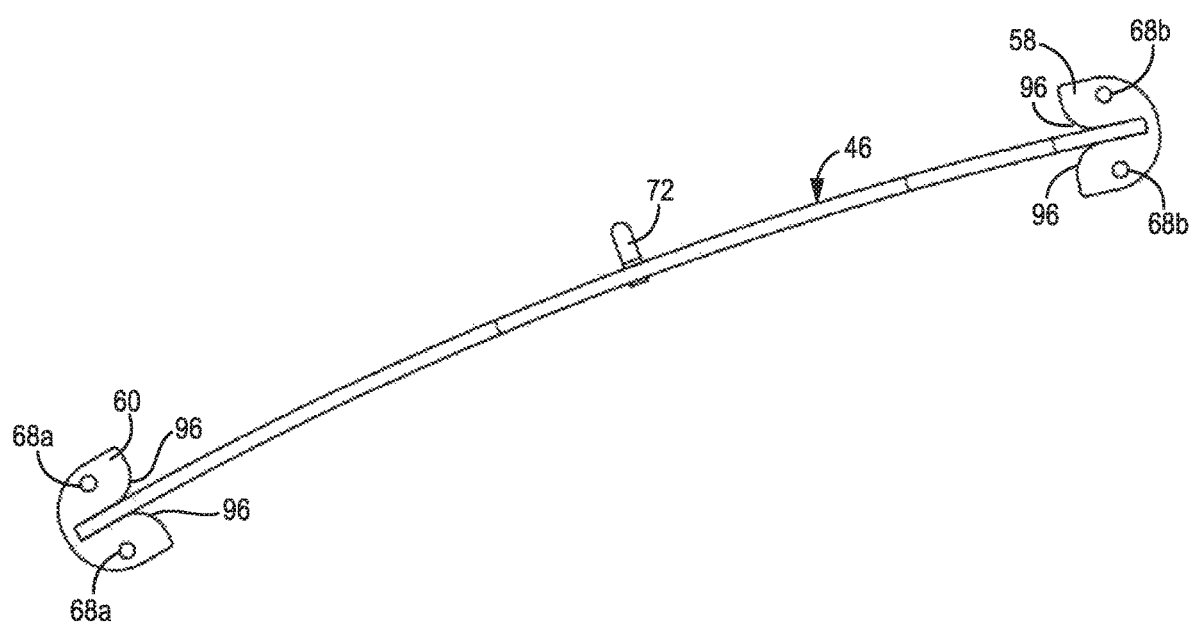
FIG. 6 is a side view of a suspension arm utilized in the rear suspension according to some embodiments.

Referring to FIG. 6, a side view of flexible member 46 is shown connected to lower shackle mount 60 and upper shackle mount 58. In some embodiments, lower shackle mount 60 includes apertures or holes 68 for receiving bolts for attaching the lower shackle mount to the slide rails 28a, 28b. Similarly, in some embodiments, upper shackle mount 58 likewise includes holes 68 for receiving bolts for attaching the upper shackle mount to the tunnel 14 and/or chassis 12. In some embodiments, one or both of the shackle mounts 58, 60 have a groove or recess for receiving a portion of the flexible member 46. In some embodiments, for example as shown in FIG. 9, lower shackle mount 60 is a C-shaped mount that includes a groove for receiving a portion of the flexible member 46. Likewise, in some embodiments, upper shackle mount 58 is a C-shaped mount that includes a groove 92 (shown in FIGS. 8 and 9) for receiving a portion of the flexible member 46. In some embodiments, an adhesive 98 (shown in FIG. 9) is utilized to maintain adhesion between the lower shackle mount 60 and flexible member 46 and likewise between upper shackle mount 58 and flexible member 46. In some embodiments, a surface 96 of upper shackle mount 58 is rounded, as shown in FIGS. 6 and 9. Likewise, in some embodiments the surface of lower shackle mount 60 is rounded. The rounded surface 96 includes that portion of upper shackle mount 58 (or lower shackle mount 60) that may contact flexible member 46 during flexing/travel of the flexible member 46. In some embodiments, the rounded surface 96 permits load to be distributed across a greater area of the shackle mount (58, 60, respectively) and larger portion of the flexible member 46 in order to facilitate longer life of the respective components and reduce fatigue.

Figure 8:
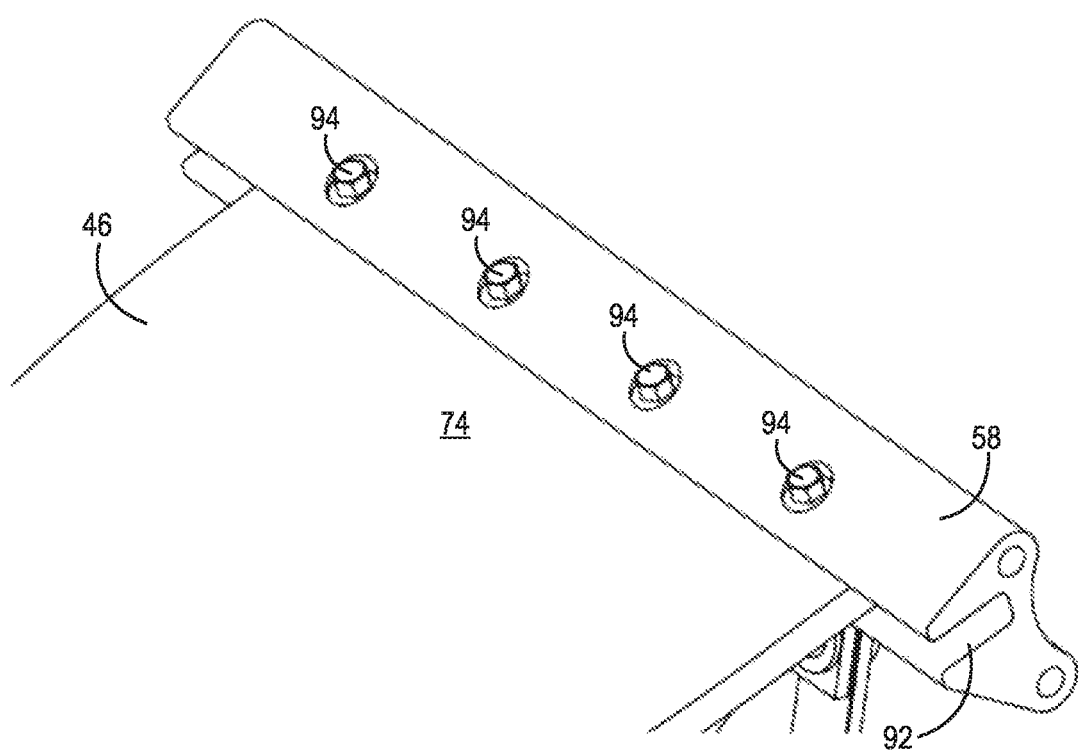
FIG. 8 is an isometric view illustrating mounting of the suspension arm to the chassis according to some embodiments.
Figure 9:
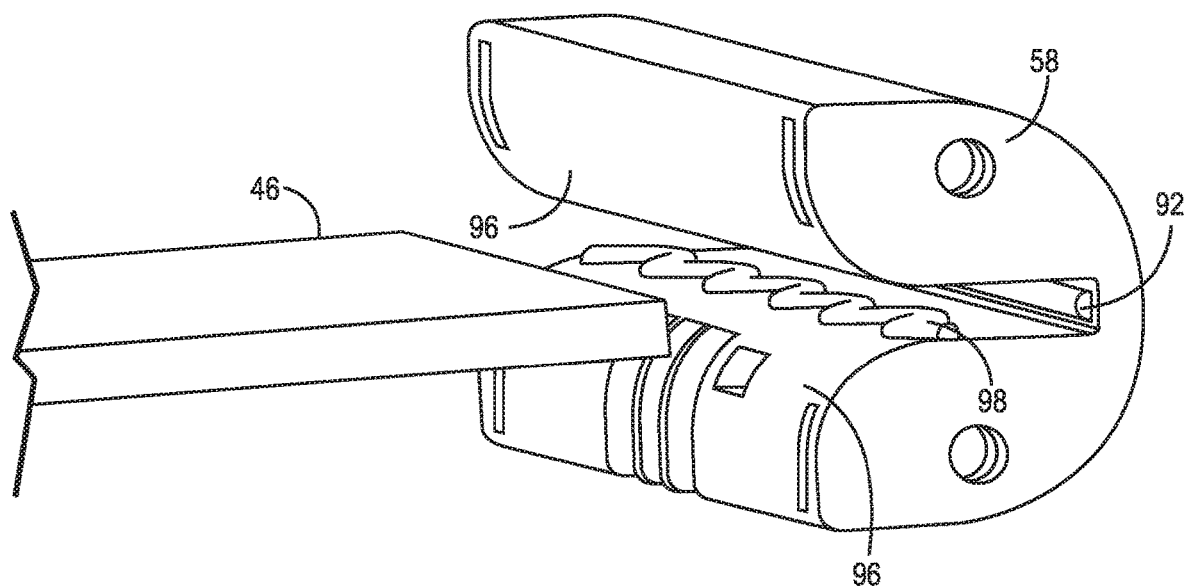
FIG. 9 is an isometric view illustrating adhesion of the suspension arm to the "c-channel" mount according to some embodiments.

In some embodiments flexible member 46 is fastened (e.g., bolted) to upper shackle mount 58 as shown in FIG. 8, in which a plurality of bolts 94 are utilized to fixedly secure flexible member 46 within the groove 92 of upper shackle mount 58. Lower shackle mount 60 may likewise include a plurality of bolts for securing the flexible member 46 within the groove of the lower shackle mount. In some embodiments, a combination of adhesive 98 and/or bolts are utilized to secure flexible member 46 to the upper and lower shackle mounts.

Figure 7:
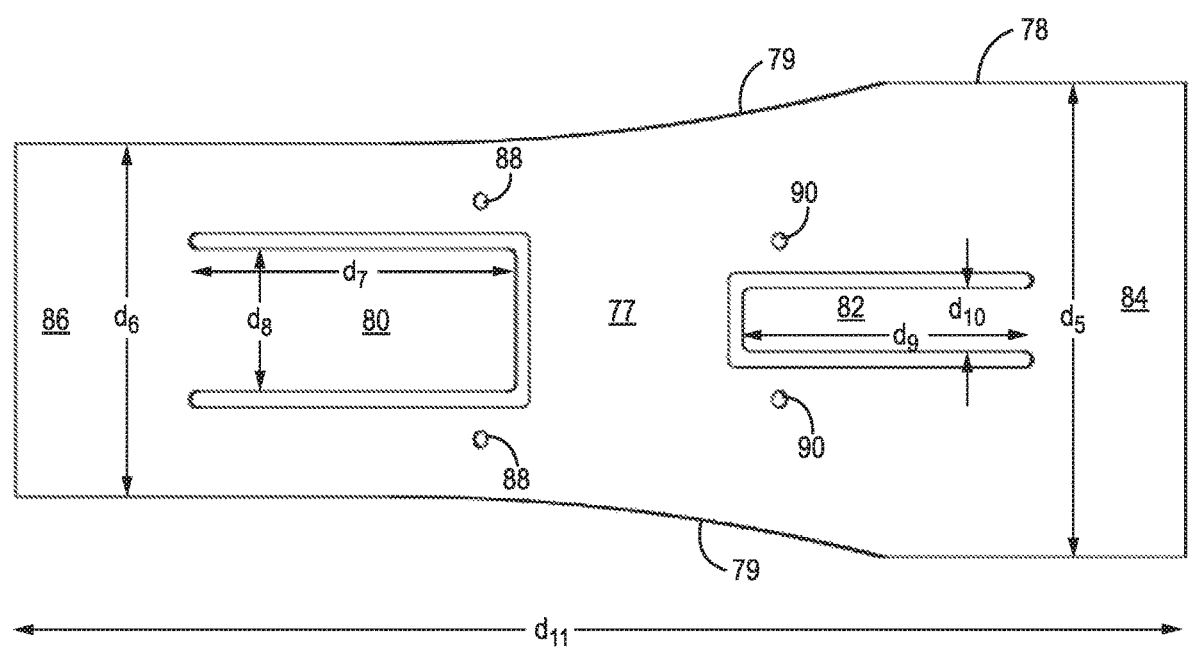
FIG. 7 is a top view of the suspension arm utilized in the rear suspension according to some embodiments.

Referring now to FIG. 7, in some embodiments, a flexible member 78 is shown that includes rear tongue 80 and forward tongue 82, wherein rear tongue 80 is located rearward of forward tongue 82. In the embodiment shown in FIG. 7, rear tongue 80 is connected to the main portion 77 of the flexible member 78 at a rear end and forward tongue 82 is connected to the main portion 77 of the flexible member 78 at a forward end. The location and orientation of rear tongue 80 contributes to the non-unitary spring rate associated with travel of the front or forward portion of the rear suspension 30. Likewise, the location and orientation of forward tongue 82 contributes to a non-unitary spring rate associated with travel of the rear portion of the rear suspension 30. In the embodiment shown in FIG. 7, forward end 84 is defined by a forward width $d_5$, and rear end 86 is defined by a rear width $d_6$. In some embodiments, the transition from the rear width to the front width is represented by a curved surface 79. In other embodiments, the transition from rear width $d_6$ to forward width $d_5$ may be linear or may utilize other geometries. The rear tongue 80 is defined by a length $d_7$ and a width $d_8$, while the forward tongue 82 is defined by a length $d_9$ and a width dm. In some embodiments, the length $d_7$ of rear tongue 80 is greater than the length $d_9$ of forward tongue 82. In some embodiments, the width $d_8$ of rear tongue 80 is greater than the width dm of forward tongue 82. In the embodiment shown in FIG. 7, the geometry of the rear tongue 80 and forward tongue 82 are selected to provide the desired change in spring rate during travel of the rear suspension, wherein the rear tongue 80 tends to impact the spring rate provided during travel of the front portion of the suspension (illustratively shown in FIG. 25C) while forward tongue 82 tends to modify the spring rate provided during travel of the rear portion of the suspension (illustratively shown in FIG. 25A). In this embodiment, a first spring rate may be provided during a first length of travel, a second spring rate may be provided during a length of travel associated with the forward portion of the rear suspension via contributions of the rear tongue 80 to the spring rate, a third spring rate may be provided during a length of travel associated with the rear portion of the rear suspension via contributions of the front tongue 82, and a fourth spring rate may be provided during a length of travel associated with both the rear portion and the front portion of the rear suspension via contributions of both the rear tongue 80 and the front tongue 82. Further still, in some embodiments, the spring rate may vary during travel of the rear suspension prior to engagement of either of the tongues 80, 82 with their respective transition mechanism. Moreover, in some embodiments, upon engagement of the respective tongue with its associated transition mechanism, the spring rate may increase to a greater degree. In such an embodiment, the flexible member 78 can have, for example, a first rising rate suspension prior to engagement of both of the tongues with the associated transition mechanism, and a second rising rate upon engagement of one of the tongues with the associated transition mechanism, and a third rising rate upon engagement of both tongues with their associated transition mechanisms. In some embodiments, the third rising rate is greater than the second rising rate and the second rising rate is greater than the first rising rate.

Figure 10:
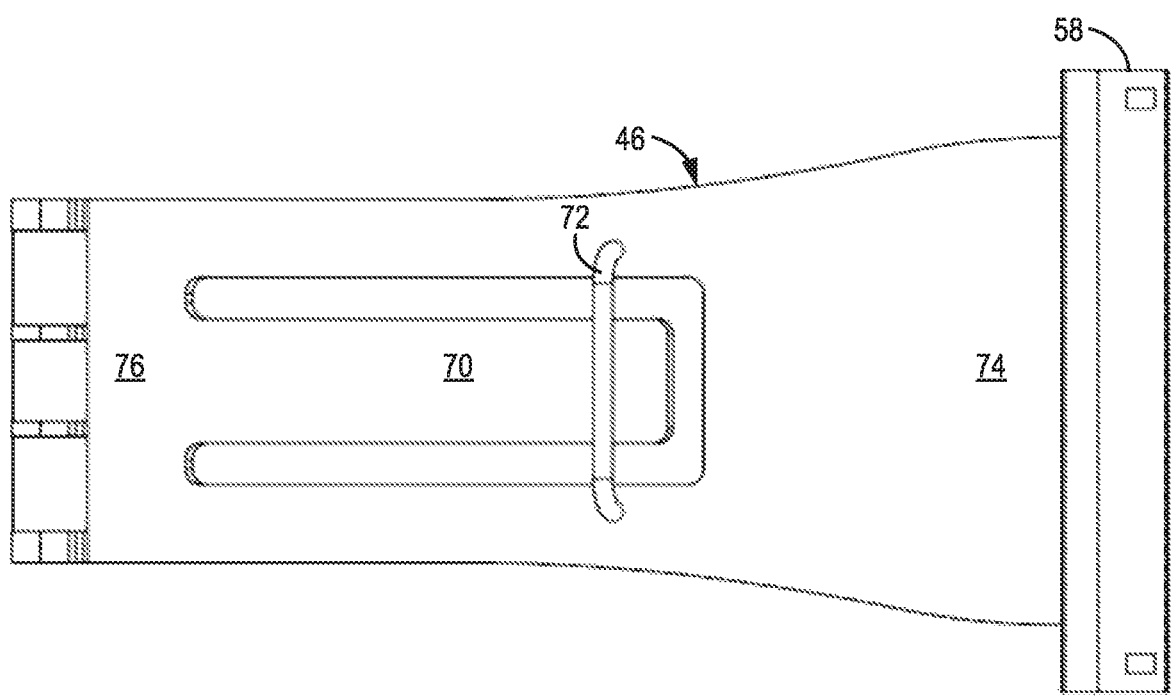
FIG. 10 is a top view of a suspension arm utilized in the rear suspension to provide dual rate suspension according to some embodiments.

In the embodiment shown in FIG. 7, bolt holes 88 are provided adjacent to rear tongue 80 for securing a rear transition mechanism (not shown) to the main portion 77 of flexible member 78 (such as the U-shaped transition mechanism 72 shown in FIG. 10). Likewise, bolt holes 90 are provided adjacent to forward tongue 82 for securing a forward transition mechanism (not shown) to the main portion 77 of flexible member 78. In some embodiments, a plurality of bolt holes 88 and 90 are provided at different positions alongside rear tongue 80 and forward tongue 82, respectively. This allows the position of the transition mechanisms to be modified along the length of rear tongue 80 and forward tongue 82. Likewise, in some embodiments the height of the transition mechanisms utilized with respect to the rear tongue 80 and/or the front tongue 82 may be modified to control the distance or amount of travel allowed before the spring rate is modified. Primarily, adjustments made to the location of the transition mechanism along the length of the rear tongue 80 or forward tongue 82 adjusts the spring rate contribution of the rear tongue 80 and/or forward tongue 82, thereby modifying the second (or third) spring rate of flexible member 78 (e.g., the spring rate provided once the transition mechanism has been engaged). Adjustments made to the height of the transition mechanism relative to the main portion of the flexible member 78 allow for adjustment of the transition point from the first spring rate to a subsequent spring rate (e.g., adjusts the length of travel associated with the rear suspension before the spring rate is transitioned from the first spring rate to a subsequent spring rate). It should be noted, that adjustments made to the location of the transition mechanism along the length of the rear tongue 80 may also have an impact on the transition point from a first spring rate to a subsequent spring rate.

Referring now to FIGS. 12-21, a snowmobile 10 having a rear suspension 100 is shown. Certain reference numerals from the above-figures are recycled with regard to these figures. For example, snowmobile 10 includes a chassis 12, a body 16, a seat 18, at least one front ski 20, front suspension 22, a skid frame 24, endless track 26, one or more slide rails 28a, 28b, rear idler wheel 32, and upper idle wheel 34. In some embodiments, the chassis 12 includes a tunnel 14. Rear suspension 30 is coupled to the chassis 12. In some embodiments rear suspension 30 is coupled to the tunnel 14 of chassis 12. The body 16 and seat 18 are secured to the chassis 12 along with other standard or optional components. The one or more skis 20 are secured to the chassis 12 through front suspension 22.

Figure 16:
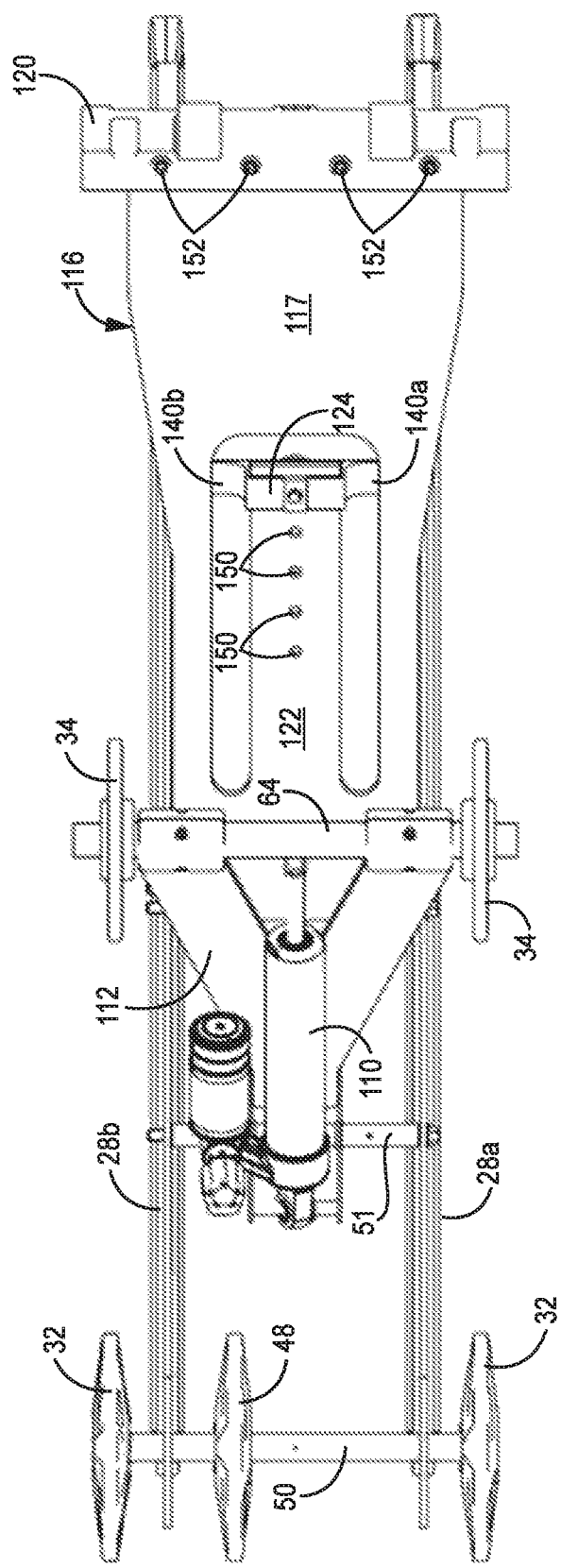
FIG. 16 is a top view of the skid frame according to some embodiments.
Figure 17:
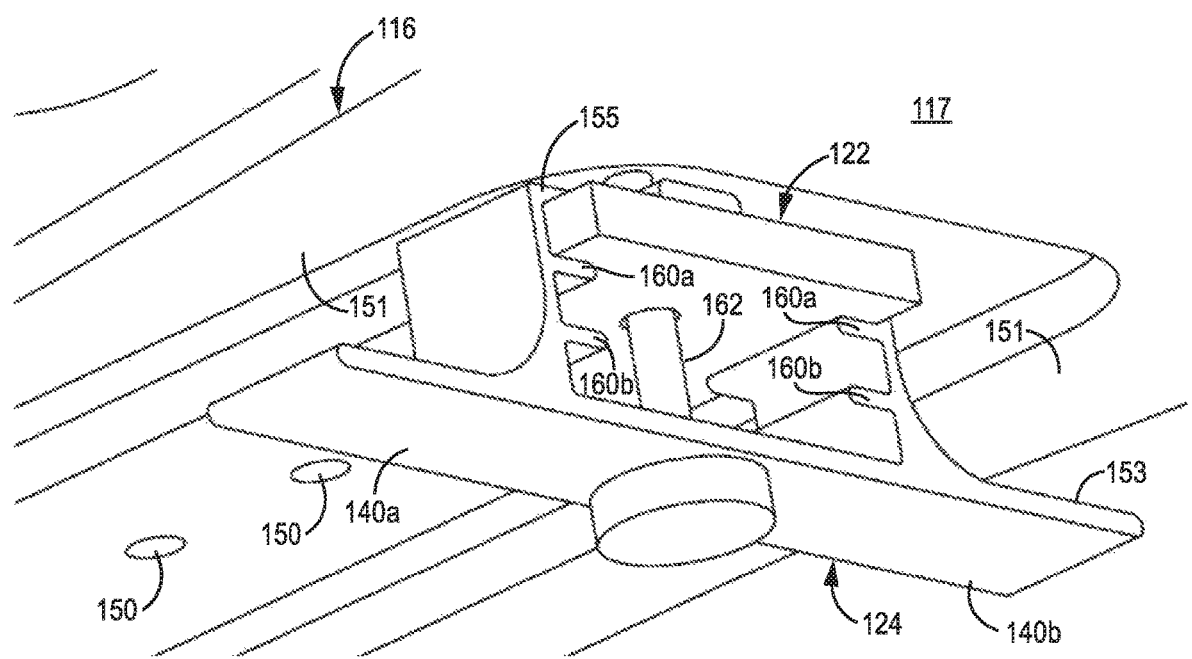
FIG. 17 is a bottom isometric view of a transition bracket utilized to control the relative movement between the tongue and the suspension arm according to some embodiments.

As discussed above, skid frame 24 includes rear suspension 30, rear idler wheel 32, upper idler wheel 34 and one or more slide rails 28a, 28b extending longitudinally along the length of the skid frame 24. In some embodiments, the one or more slide rails 28a, 28b are interconnected to the tunnel 14 and/or chassis 12 through rear suspension 30. In some embodiments, for example, in the embodiment shown in FIGS. 12-16, a pair of slide rails 28a, 28b extend longitudinally along the length of the skid frame 24, wherein the rails slide 28 are substantially parallel with one another. As shown in FIG. 16, a plurality of cross-members are connected to the pair of slide rails 28a, 28b, including rear cross member 50, first middle cross member 51, second middle cross member 52, and forward cross member 53.

In some embodiments, the rear suspension 100 includes one or more of the following: rear shock 110, structural shock link 112, flexible member 116, lower shackle mount 118, upper shackle mount 120, tongue 122, and transition assembly 124. As described with respect to FIGS. 1-11, flexible member 116 is connected to the one or more slide rails 28a, 28b via lower shackle mount 118 and to the chassis 12 via upper shackle mount 120. In some embodiments, the flexible member 116 includes a tongue 122 separated from the main portion 117 of flexible member 116 on three sides. In some embodiments, the tongue 122 is connected to the main portion 117 via a rear side. A transition assembly 124 is utilized to limit travel of the main portion of flexible member 116 relative to tongue 122 and define where, in range of travel, the suspension transitions from a first spring rate to a second spring rate.

Figure 13:
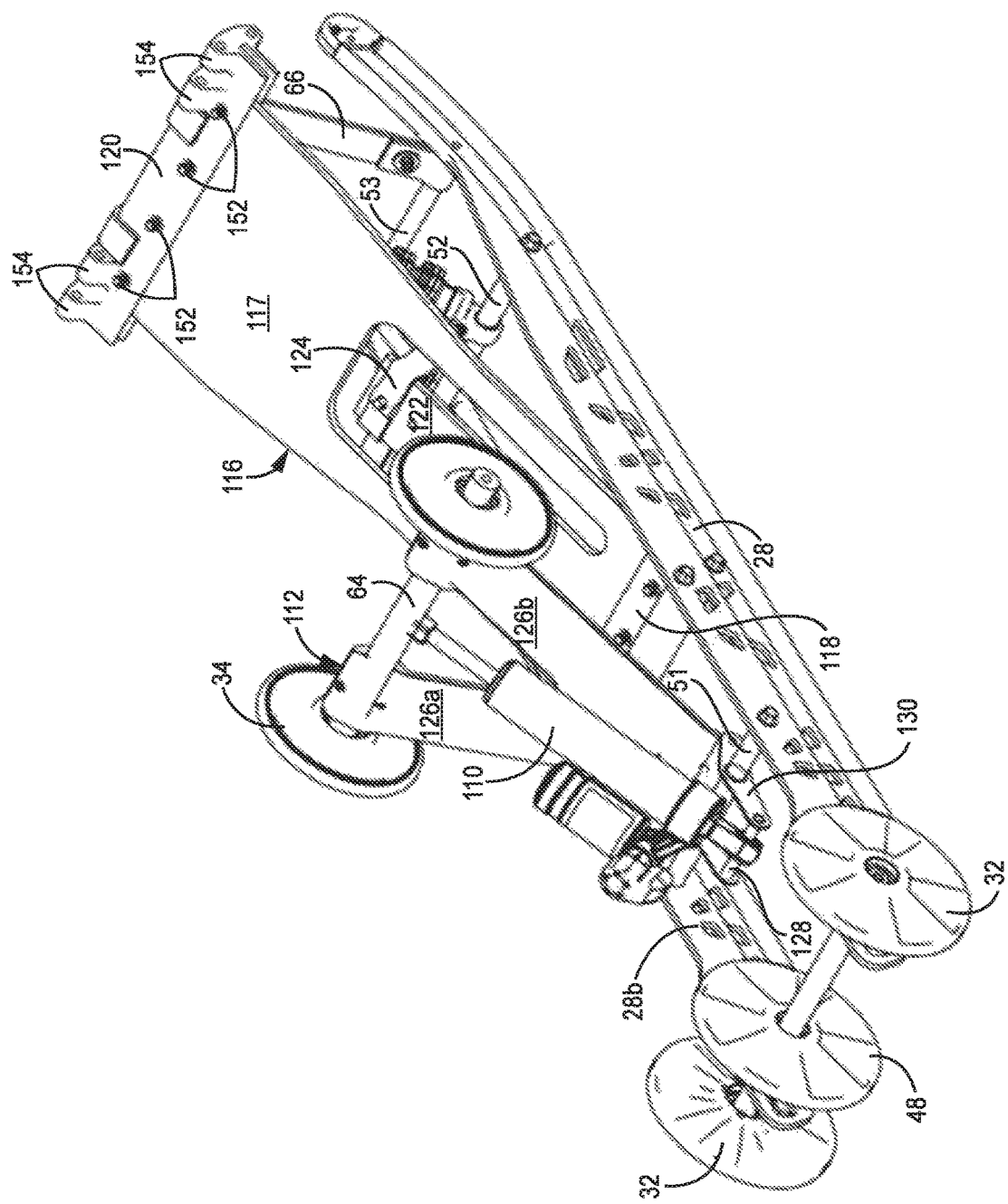
FIG. 13 is a rear isometric view of the skid frame according to some embodiments.

In the embodiment shown in FIG. 13, rear shock 110 is connected to upper cross member 64, and further connected to lower cross member 51 via a lower shock pivot member 130. In some embodiments, a lower shock pivot member 130 is pivotally connected to rear cross member 51. The lower shock pivot member 130 includes a rear cross member 128 that is pivotally connected to one end of rear shock 110 and a forward end that is connected to structural shock link 112. The rear shock 110 extends between the lower shock pivot member 130 and the upper cross-member 64 that is, in turn, connected to the chassis/tunnel. Further, in some embodiments, the upper cross-member 64 has upper idler wheels 34 rotatably connected thereto.

In some embodiments, structural shock link 112 has a Y-frame geometry that includes first leg 126a and second leg 126b. The structural shock link 112 is pivotally connected to lower shock pivot member 130 on a first end and pivotally connected to upper cross-member 64 on a second end (upper ends of the respective first leg 126a and second leg 126b). In some embodiments, structural shock link is a composite that includes a fiber and resin composition selected to provide the desired stiffness and strength. For example, in some embodiments, the structural shock link 112 is a unidirectional fiber (e.g., glass fiber, carbon fiber) within an epoxy resin matrix. In some embodiments, a unidirectional glass fiber comprises by volume between 50-70% of the composite structure. In some embodiments, the unidirectional glass fiber extends generally longitudinally along the length of the structural shock link 112. In some embodiments, however, the structural shock link 112 is isotropic, for example of a homogenous fiber-resin matrix. In some embodiments, the structural shock link 112, in combination with the rear shock 110, provides progressive damping and/or a progressive spring rate for the rear arm assembly of the rear suspension. In addition, in some embodiments, the Y-shaped structural shock link 112 is designed to flex. In some embodiments, for example, it is designed to "twist" in order to permit somewhat independent travel of the first slide rail 28a (e.g., left-side rail) relative to a second slide rail 28b. In some embodiments, the structural shock link 112 is formed from a metallic material or alloy (e.g., aluminum, magnesium, steel) and via any appropriate manufacturing technique (casting, forging, etc.). Combinations of materials can also be used to make the structural shock link 112 (e.g., aluminum and a fiber-reinforced matrix).

Figure 30:
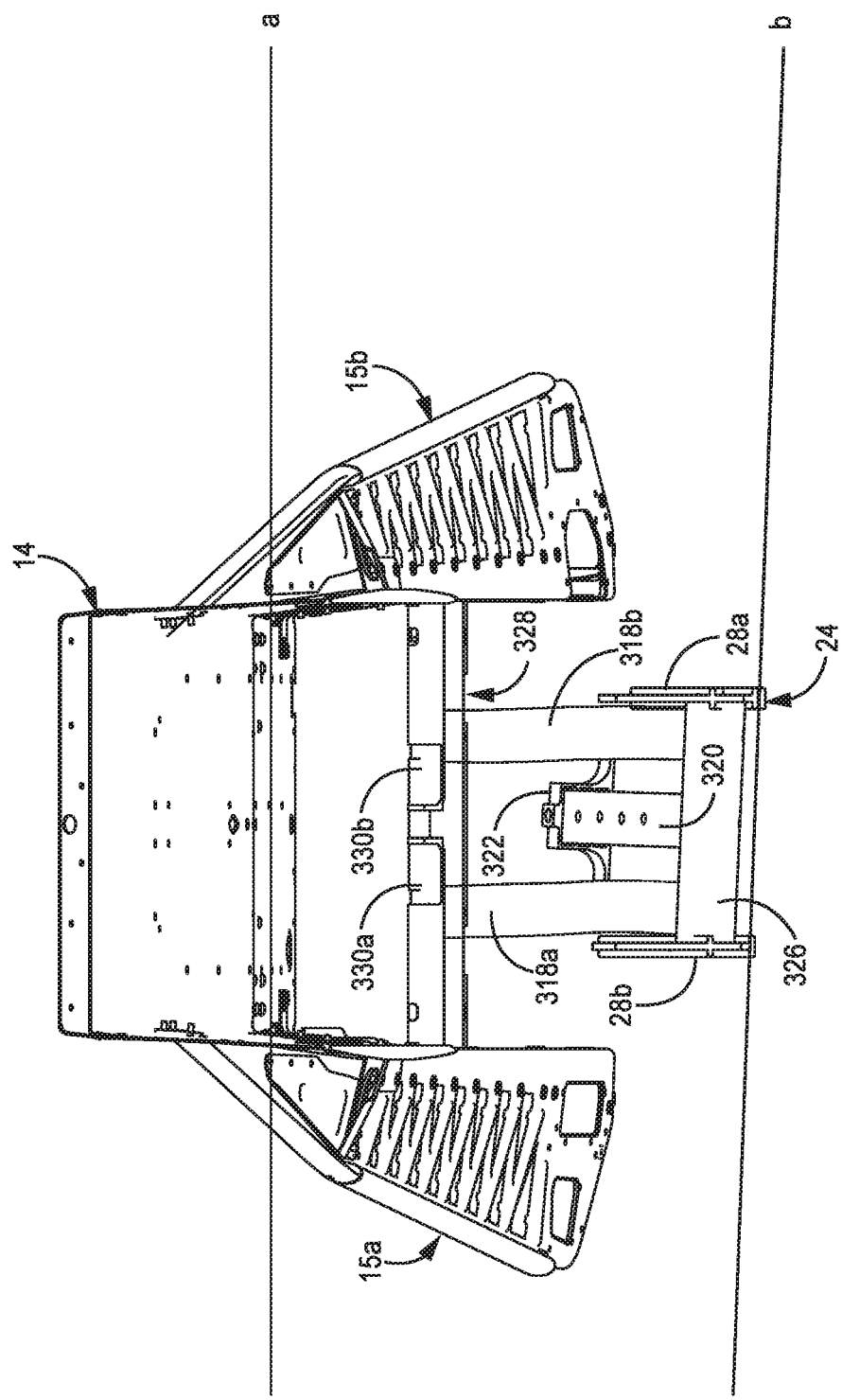
FIG. 30 is a rear view of the tunnel and skid frame according to some embodiments.

With further regard to FIG. 13, in some embodiments, flexible member 116 is fixedly affixed to a lower shackle mount 118 and to an upper shackle mount 120. Lower shackle mount 118 is affixed to the slide rails 28, for example to first and second slide rails 28a and 28b and/or to a single rail. In some embodiments, lower shackle mount 118 is coupled to the first and second slide rails 28a, 28b. In some embodiments, the flexible member 116 is designed to twist, in order to permit the skid frame 24 to be non-parallel with the chassis 14 of the snowmobile. For example, FIG. 30 is a rear view illustrating the twisting of the rear suspension 300 relative to the chassis 14 of the snowmobile. As shown in FIG. 30, a first plane a is defined by the orientation of the chassis 14 and a second plane is defined by the bottom of slide rails 28a and 28b. In the example provided in FIG. 30 the planes are non-parallel with one another, indicating a twisting of the rear suspension 300.

In some embodiments, flexible member 116 includes one or more tongues 122 utilized to contribute to a second or subsequent spring rate and one or more mechanisms for controlling the transition from the first spring rate to a second or subsequent spring rate. In the embodiment shown in FIGS. 13-18, the mechanism includes a transition assembly 124 that is affixed to the tongue 122 and includes one or more arms 140a and 140b extending laterally to interact with the main portion 117 of flexible member 116.

Figure 14:
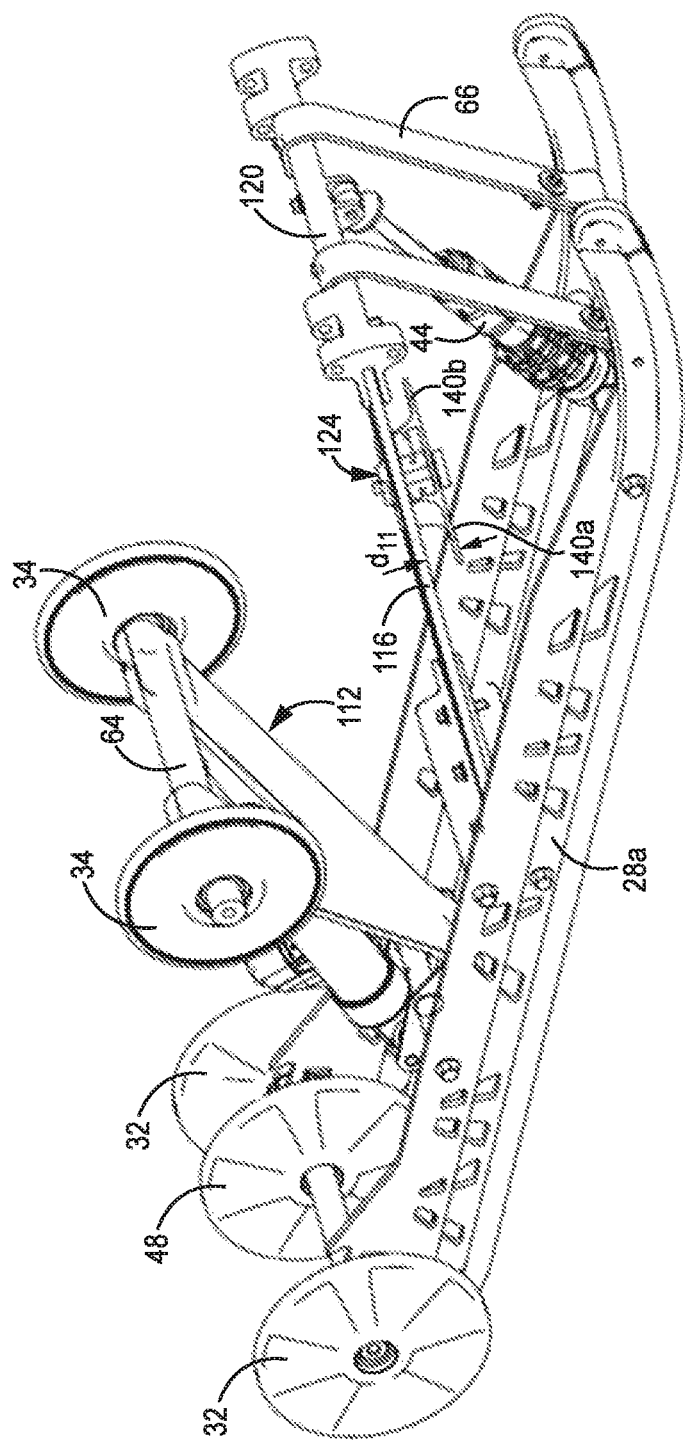
FIG. 14 is a front isometric view of the skid frame according to some embodiments.
Figure 15:
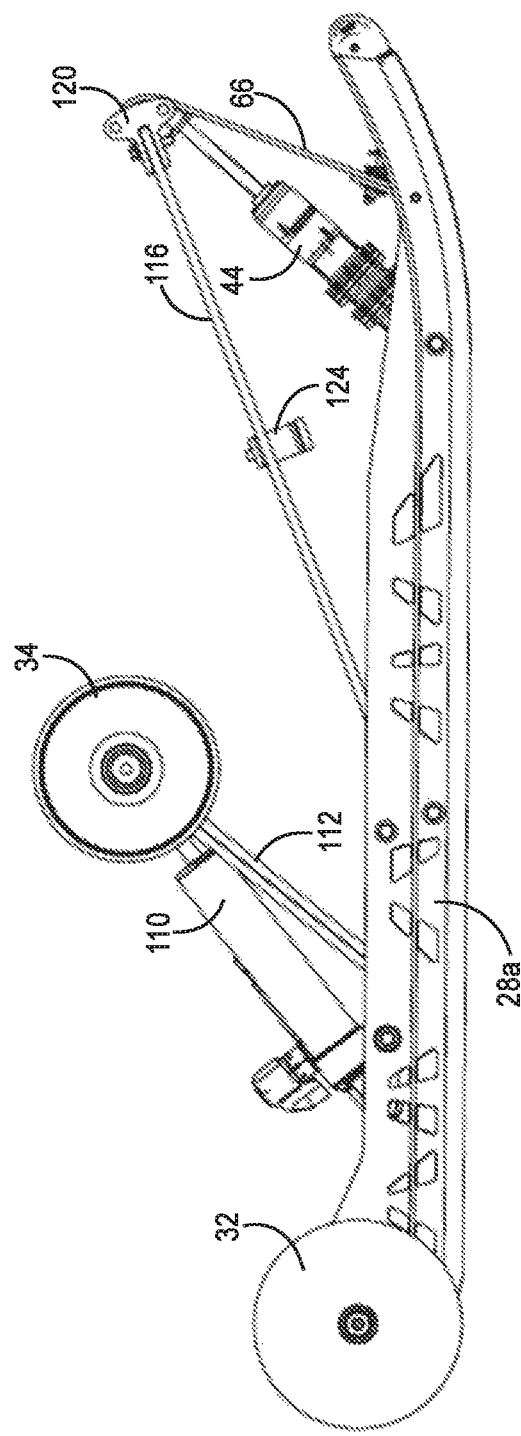
FIG. 15 is a side view of the skid frame according to some embodiments.

For example, in the embodiment shown in FIG. 14, the relationship between the transition assembly 124 and the main portion 117 is shown. In particular, the arms 140a and 140b are shown in a first position in which the arms 140a and 140*b* are separated from the main portion 117 by a distance $d_{11}$, referred to as a "resting" distance measured when the rear suspension is in an unloaded state. As described above, the flexible component 116 provides a first spring rate for a first distance of travel wherein the one or more arms 140*a* and 140*b* remain separated from the main portion 117. After a first length of travel of the flexible member 116 the one or more arms 140*a* and 140*b* come into contact with a bottom surface 151 of the main portion 117, which results in the tongue 122 contributing to the spring rate provided by the flexible member 116 to provide a second spring rate.

In some embodiments, the location of the transition assembly 124 along the length of the tongue 122 may be selectively modified. In some embodiments, the transition assembly is affixed to the tongue 122 via one or more fasteners. In some examples, the fastener is a bolt that extends through one of the available bolt holes 150. The first spring rate provided by the flexible member 116 is independent of the location of the transition assembly 124, because the first spring rate is a function of the main portion of the flexible member 116 and does not include the tongue 122. The second spring rate includes contributions from the tongue 122 and main portion 116. The location of the transition assembly 124 along the length of the tongue 122 influences the contribution from the tongue 122. For example, the contribution to the spring rate provided by the tongue 122 decreases as the transition assembly is moved toward the end of the tongue 122 (e.g., forward in the embodiment shown in 16). In addition, changing the location of the transition assembly 124 along the length of the tongue 122 may also change the amount of travel that occurs in the rear suspension before the spring rate is changed.

Figure 18:
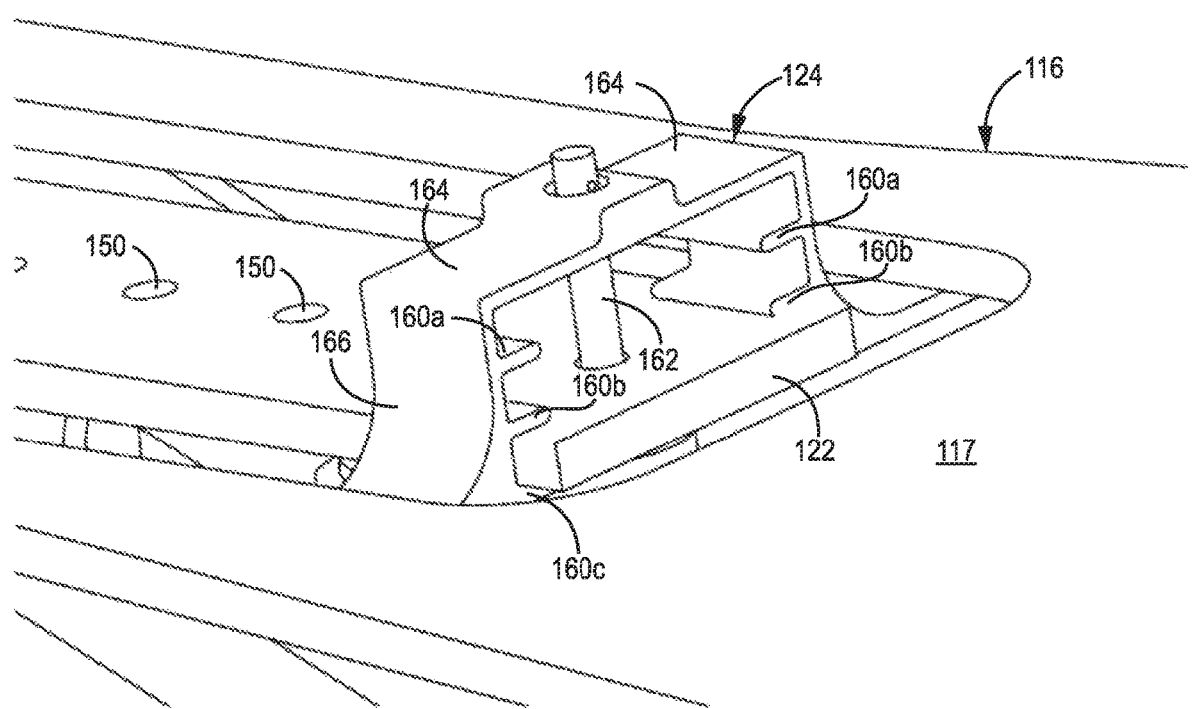
FIG. 18 is a top isometric view of a transition bracket utilized to control the relative movement between the tongue and the suspension arm according to some embodiments.

In some embodiments, the resting distance $d_{11}$ between the one or more arms 140*a*, 140*b* and the main portion 116 may be selectively modified to change the transition point between the first spring rate and second spring rate. In some embodiments, the transition assembly 124 includes one or more grooves defined by ledge 160*a*, 160*b*, and 160*c* that allows the vertical position of the transition assembly 124 to be selectively modified. The grooves defined by ledges 160*a*, 160*b*, 160*c* are configured to receive the tongue 122. For example, in the embodiment shown in FIG. 17, a portion of the tongue 122 is situated between ledges 160*a* and top member 155 of the transition assembly 124, thereby setting a resting distance $d_{11}$ between a top surface 153 of the arms 140*a*, 140*b* and the main portion of the flexible member 116. To modify the resting distance $d_{11}$, the tongue 122 is placed in the groove between ledge 160*a* and 160*b*, which decreases the resting distance $d_{11}$ between the main portion of the flexible member 116 and transition arms 140*a*, 140*b*. For example, as shown in FIG. 18, the resting distance $d_{11}$ is further decreased by locating tongue 122 in the groove defined between ledge supports 160*b* and 160*c*. Decreasing the resting distance $d_{11}$ changes the length of travel that occurs in the rear suspension before the spring rate is modified by the transition assembly 124 coming into contact with the main portion of the flexible member 116. In other embodiments, other mechanisms may be utilized to set and modify the initial distance $d_{11}$ between the arms 140*a*, 140*b* and main portion 117.

In some embodiments both the position of the transition assembly 124 along the length of the tongue 122 and the distance between the arms 140*a*, 140*b* of the transition assembly 124 and the main portion of the flexible member 116 may be modified to selectively modify the length of travel before the spring rate is modified and/or the magnitude of the second spring rate. This allows the response of the rear suspension to be selectively modified, for example in response to different rider characteristics and/or desired performance.

Figure 19:
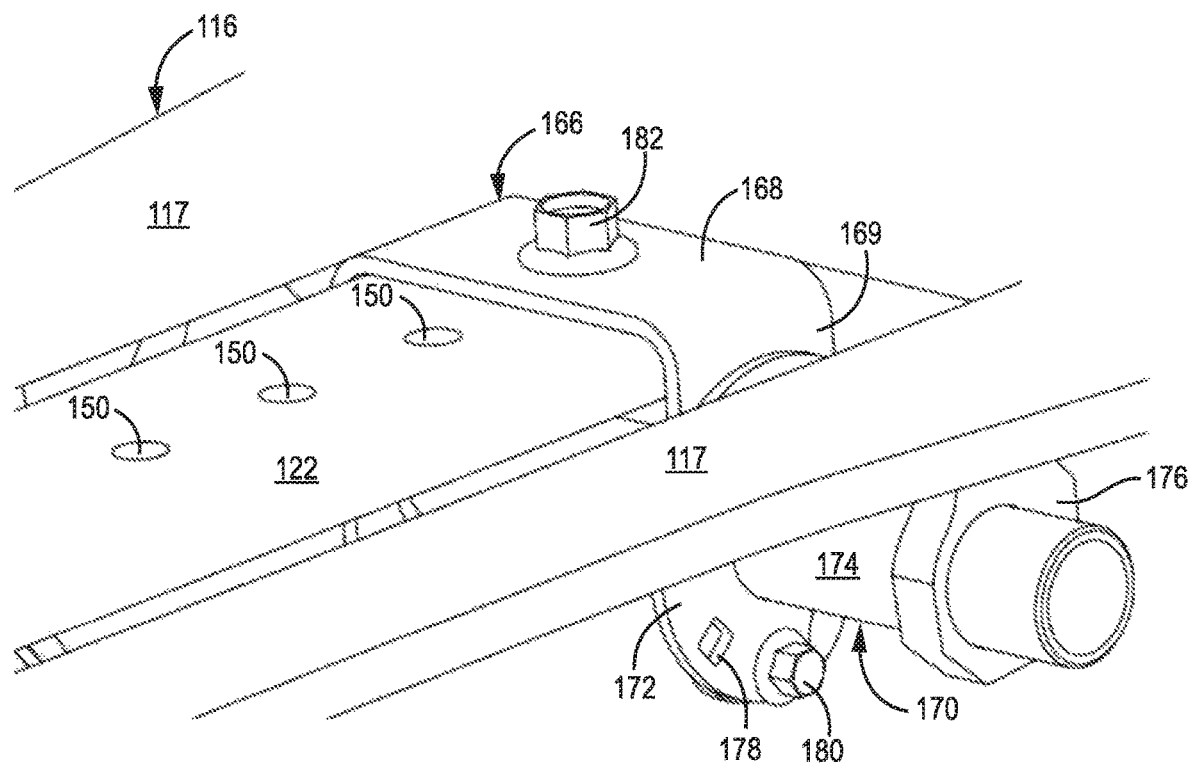
FIG. 19 is a top isometric view of a transition bracket having a cam for adjusting the relative movement between the tongue and the suspension arm according to some embodiments.
Figure 20A:
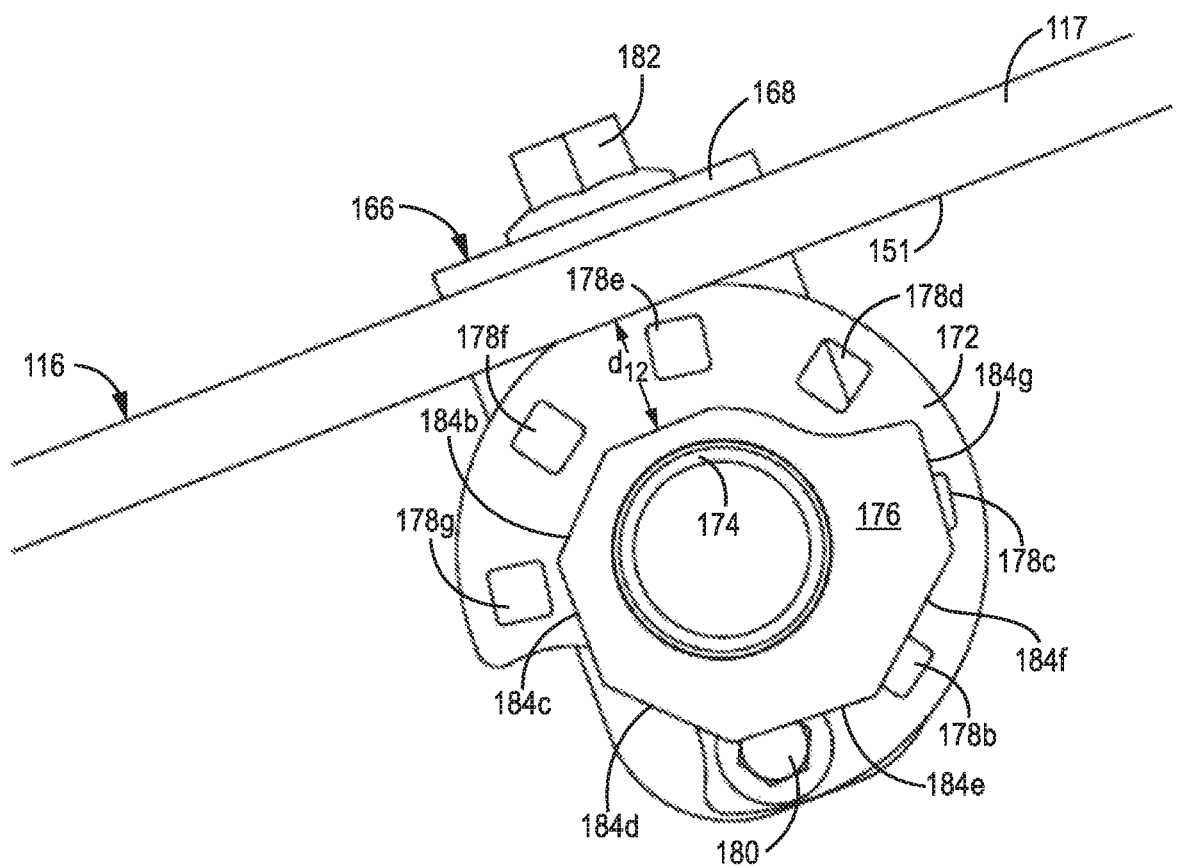
FIGS. 20A and 20B are side views of the transition bracket in first and second positions according to some embodiments.
Figure 20B:
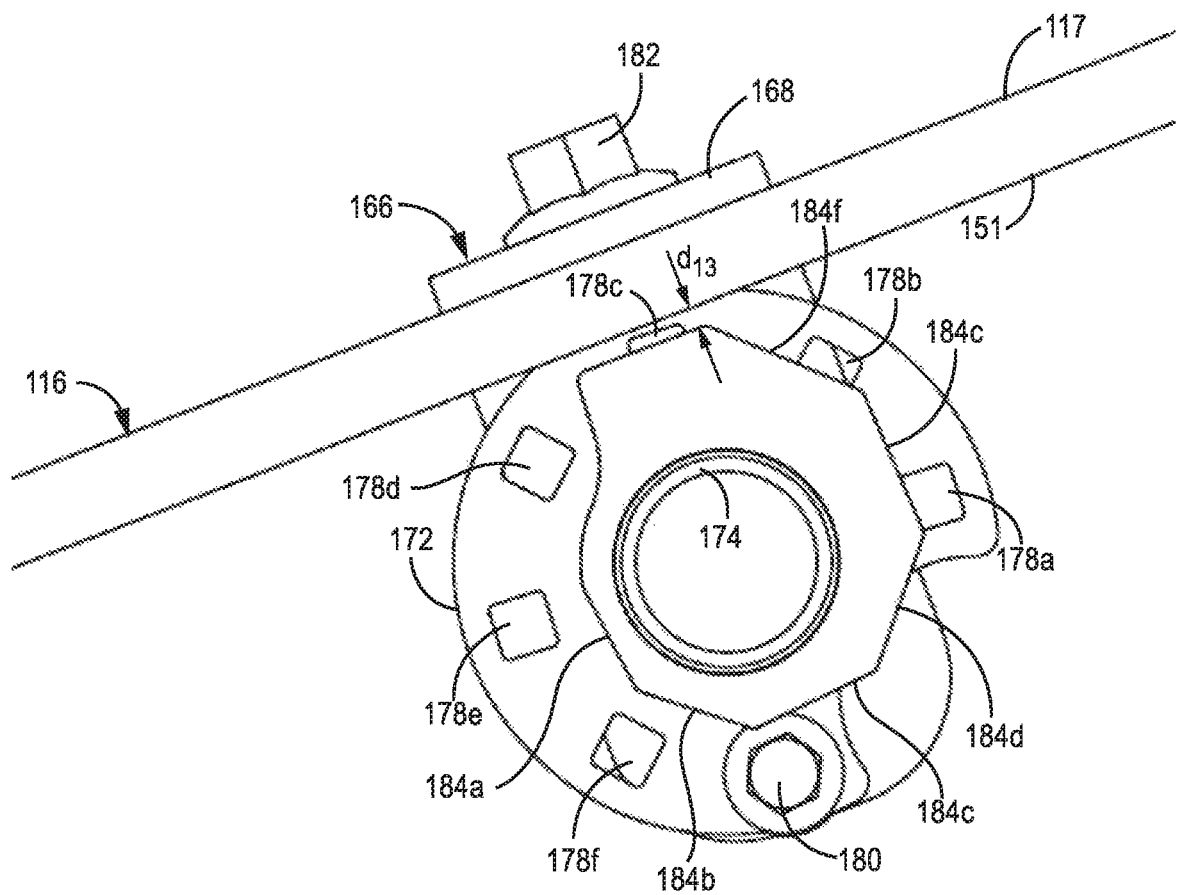
Figure 21:
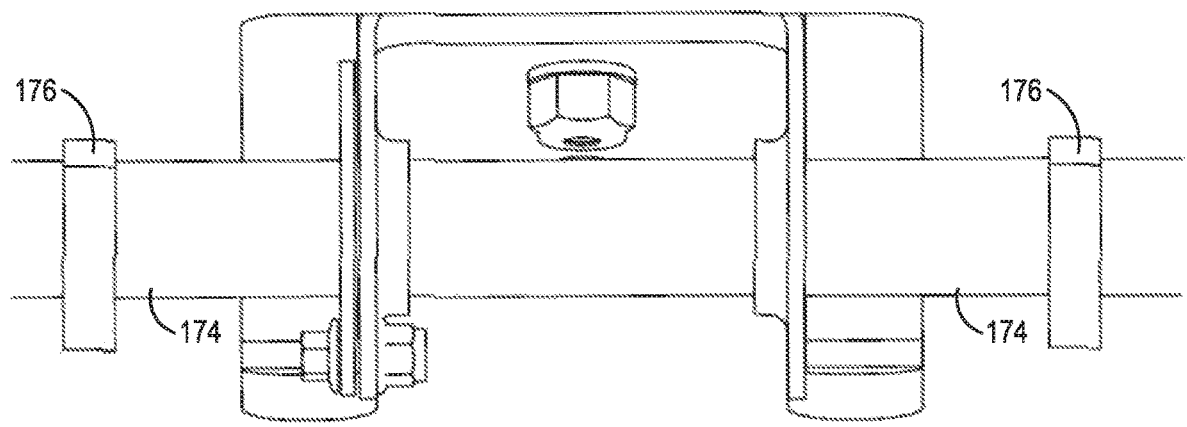
FIG. 21 is a top view of the transition bracket according to some embodiments.

Referring now to FIGS. 19-21, a transition assembly 166 is provided that includes a cam assembly 170 that allows the distance between the tongue 122 and the main portion 117 to be modified via position of the cam assembly 170. In this embodiment, a top portion 168 of the transition assembly 166 is affixed to the tongue 122 using a fastener 182 secured to one of the plurality of apertures 150. In some embodiments, the top portion 168 of the transition assembly 166 may be secured to any one of the plurality of apertures 150, allowing the position of the transition assembly 166 to be selected along a length of the tongue 122. In some embodiments, the top portion 168 includes arms 169 extending downward on either side of tongue 122, wherein the cam assembly 170 is secured to the arms 169 (as shown in FIG. 19). Cam assembly includes a disc 172 having a plurality of apertures 178*a*-178*g* located around at least a portion of the circumference of the disc 172, an arm 174, and a cam 176. In some embodiments, a similar cam assembly is provided on both sides of tongue 122. In some embodiments, the cam 176 includes a plurality of surfaces 184*a*-184*g*, each located a different radius or length from the center of the cam 176. The various radiuses of surfaces 184*a*-184*g* allow the distance between the cam surfaces 184*a*-184*g* and a bottom surface 151 of the main portion 117 to be selectively modified. For example, in the embodiment shown in FIG. 20A, the distance die is defined as the distance between cam surface 184*a* and the bottom surface 151 of the main portion. In the embodiment shown in FIG. 20B, this distance is reduced by rotating the cam so that cam surface 184*g* is facing the bottom surface 151 of the main portion 117 (as shown by distance $d_{13}$). In this way, the transition point from the first spring rate to the second spring rate can be selectively modified by adjusting the position of the cam assembly 170, wherein decreasing the distance reduces the length of travel associated with the first spring rate before the transition point to the second spring rate.

In some embodiments, the cam assembly 170 is rotated by rotating disc 172 and securing fastener 180 through one of the plurality of apertures 178*a*-178*g* located around the periphery of the disc 172. A benefit of cam assembly 170 is that the length of travel associated with the first spring rate may be modified without having to disconnect the transition assembly 166 from the tongue 122.

Figure 23:
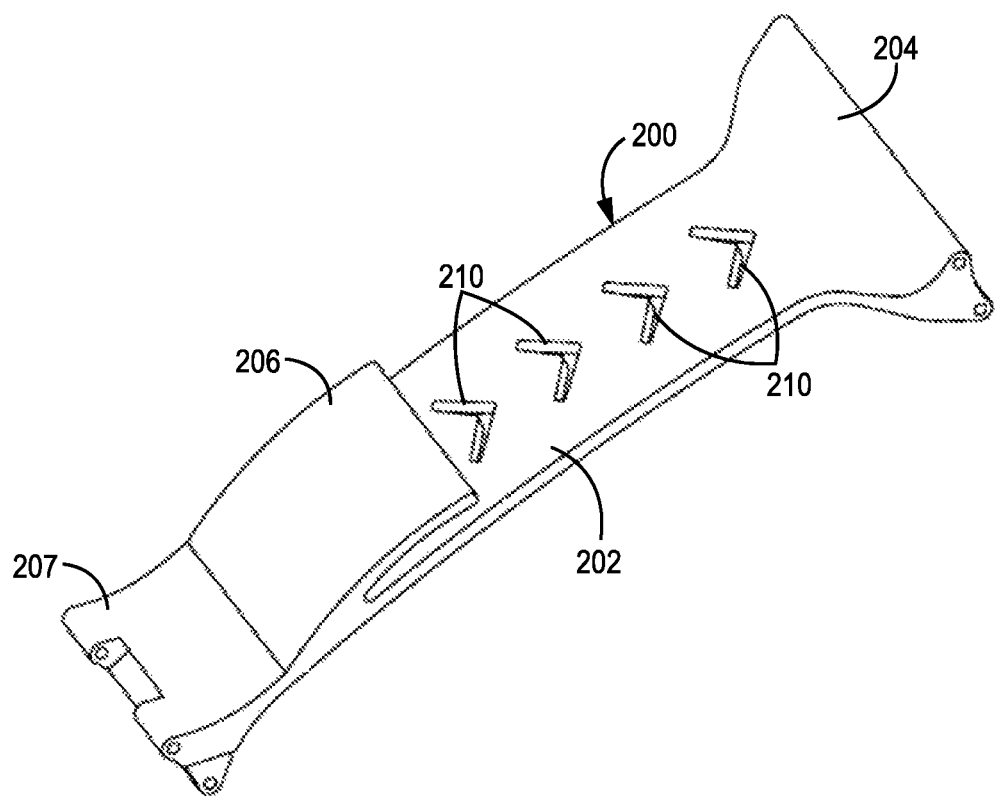
FIG. 23 is an isometric view of a suspension arm that includes a finger portion utilized to provide dual-rate suspension according to some embodiments.
Figure 24:
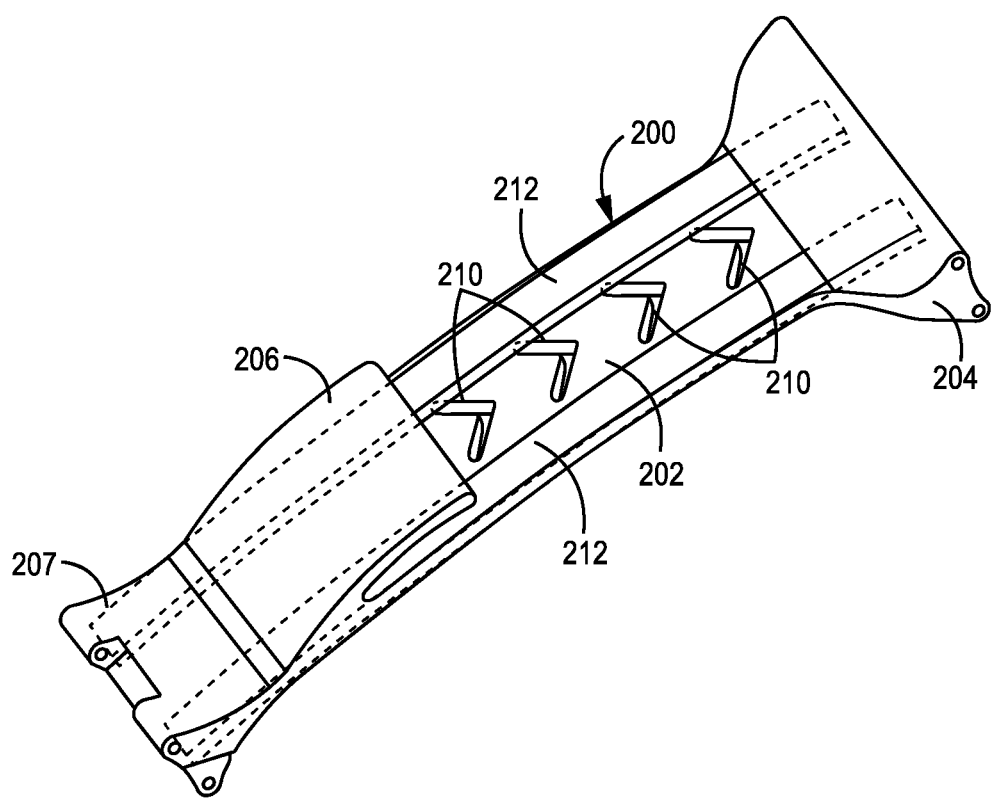
FIG. 24 is an isometric view of a suspension arm that includes two uni-directional arms with a long fiber injection molded arms according to some embodiments.

Referring now to FIGS. 22-24, in some embodiments, a flexible member 200 is provided that provides at least a first spring rate over a first distance of travel and a second spring rate over a second distance of travel. As shown, the flexible member 200 utilizes a main body 202 and a secondary body 206 that is separated from the main body 202 by a distance $d_{14}$ when in an unloaded state or "rest" state. In the embodiment shown in FIG. 22, flexible member 200 includes upper shackle mount 204 and lower shackle mount 207 for fixedly connecting the flexible member 200 between the one or more slide rails 28*a*, 28*b* and the chassis 12. Lower shackle mount 207 includes a groove 205 formed in an outer surface of lower shackle mount 207 for receiving a portion of slide rails 28*a*, 28*b*. For example, FIG. 30 is a rear view of flexible member 316 that includes lower shackle mount 326 affixed to slide rails 28*a* and 28*b*. In some embodiments, lower shackle mount 326 includes a groove 332*a* and 332*b* formed on the outer surface of lower shackle mount 326 and configured to mate with a tongue portion of slide rails 28*a* and 28*b* as shown.

A first spring rate is provided by the flexible member 200 during a first length of travel, during which a distance or gap exists between secondary body 206 and main body 202. The spring rate transitions from the first spring rate to a second spring rate when the secondary body 206 comes into contact with the main body 202, at which point the secondary body 206 contributes to the spring rate provided by the flexible member 200. In the embodiment shown in FIGS. 23-24, the width of secondary body 206 is approximately, equal to the width of the main body 202. In other embodiments, the spring rate contribution of secondary body 206 may be changed by modifying the width, length, material, and/or thickness of secondary body 206.

In the embodiment shown in FIG. 23, a plurality of grooves 210 are located within the main body 202 of the flexible member 200. The grooves 210 may be machined or molded-in to provide a desired spring rate associated with the main body 202. In other embodiments, the shape and/or geometry (e.g., length, width, thickness) of the main body, may also be modified or designed to provide the desired spring rate characteristics. The grooves 210 may be utilized in combination with changes to the geometry of the flexible member to provide the desired spring rate characteristics as well as desired weight and strength characteristics.

In some embodiments, the flexible member 200 is a composite material. For example, in some embodiments, flexible member 200 is a nylon 6/6 (polyamide 6/6) matrix with a glass fiber or carbon fiber fill (or a combination of both). In other embodiments, various other composite materials may be utilized to provide the desired spring rate, strength, and weight characteristics.

In some embodiments, such as those shown in FIG. 24, one or more unidirectional arms 212 are over molded with the composite material making up flexible member 200. The arms 212 may utilize a different composite material, such as a long fiber composite that provides additional strength in the torsional direction. One or more unidirectional arms 212 may be utilized in any of the previous described embodiments.

In some embodiments, the distance between the secondary body 206 and the main body 202 may be modified by securing an attachment (not shown) that decreases the initial distance between secondary body 206 and main body 202.

Figure 25A:
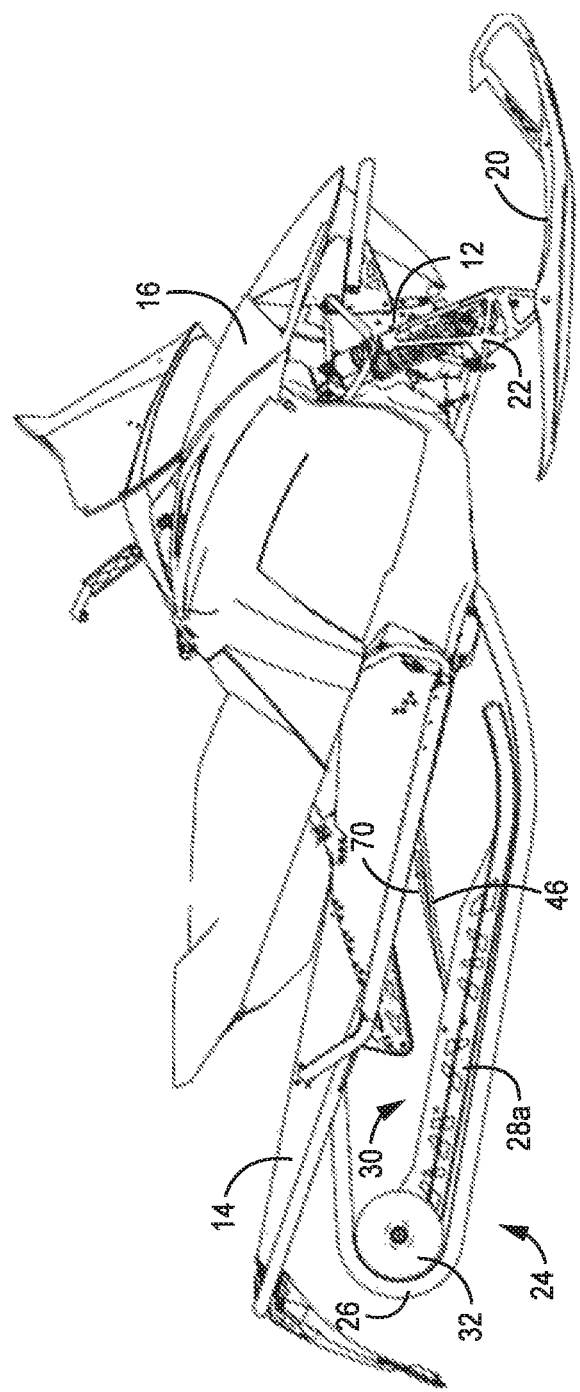
FIGS. 25A-25C are side views of the snowmobile and rear suspension in various states of travel, including rear travel, front and rear travel, and front travel, respectively.
Figure 25B:
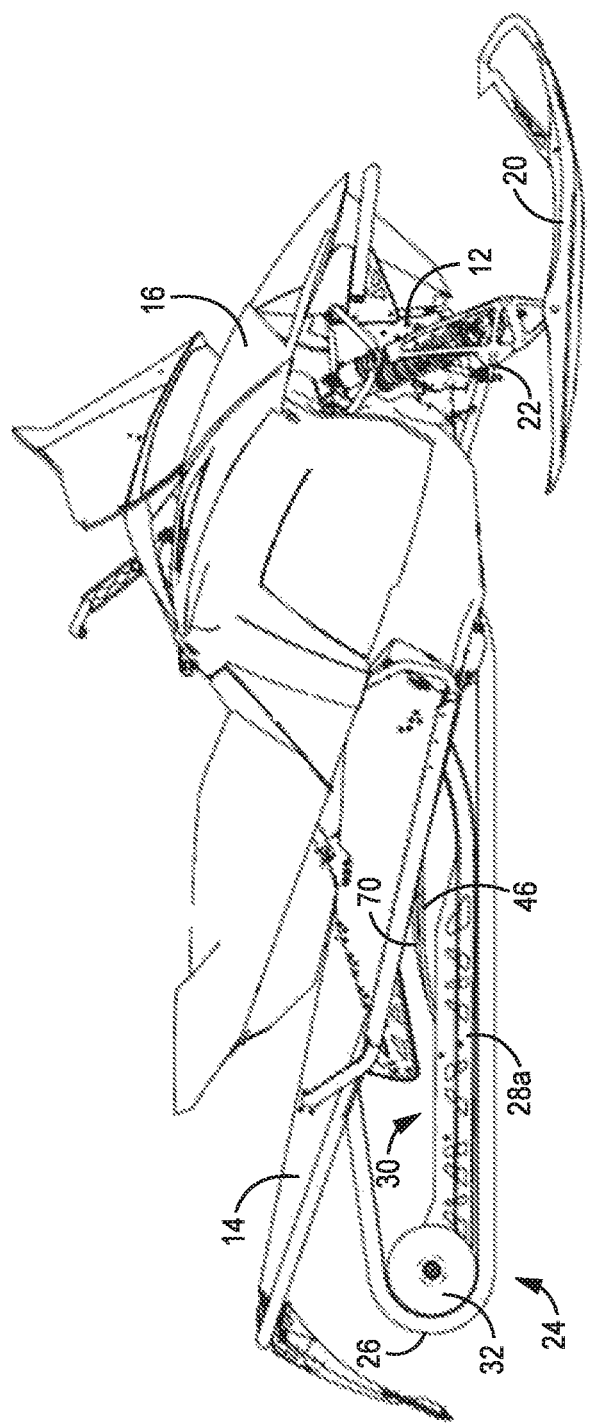
Figure 25C:
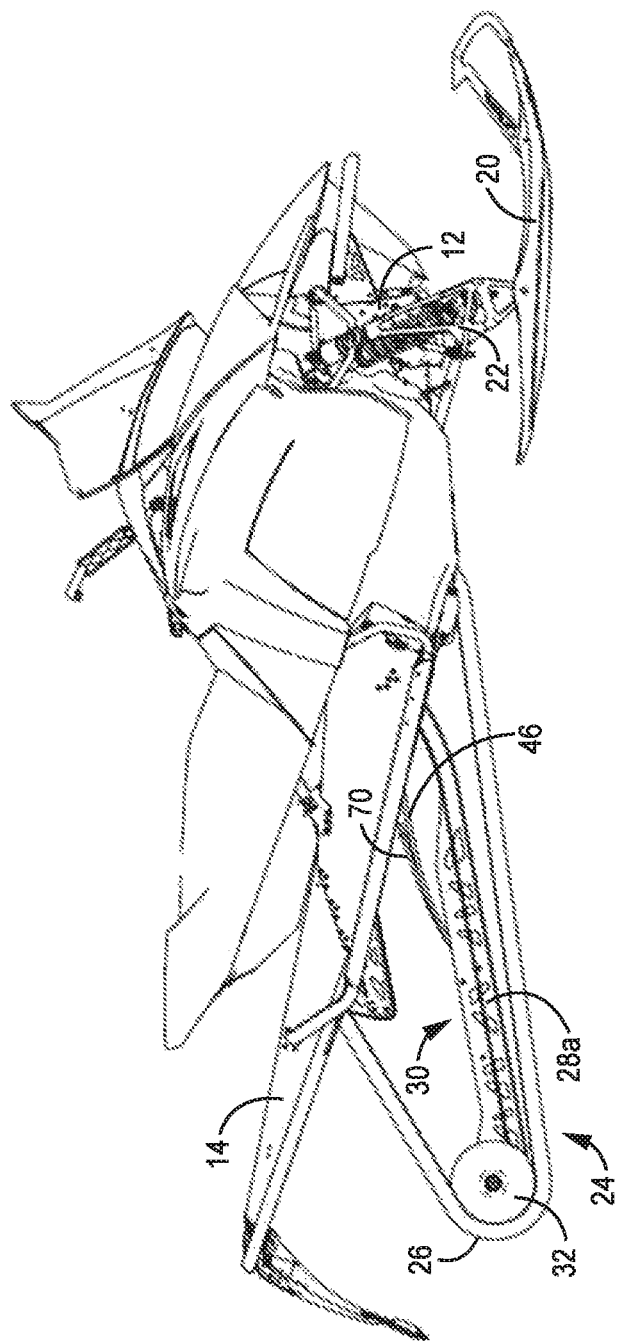
Figure 26A:
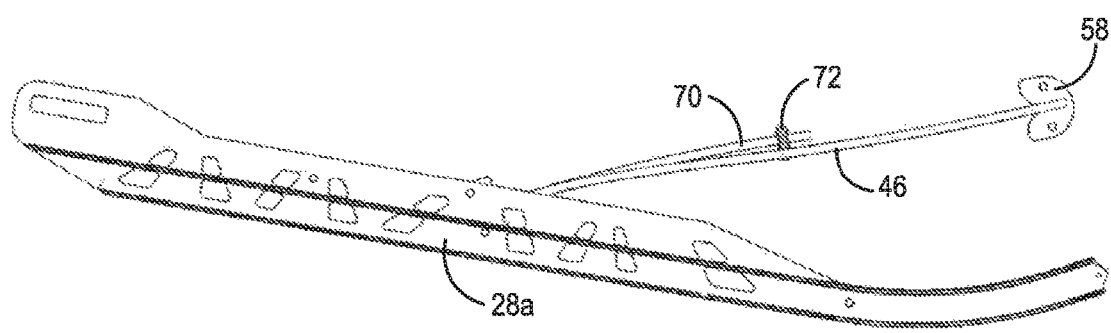
FIGS. 26A-26C are side views of the rear suspension in various states of travel, including rear travel, front and rear travel, and front travel, respectively.
Figure 26B:
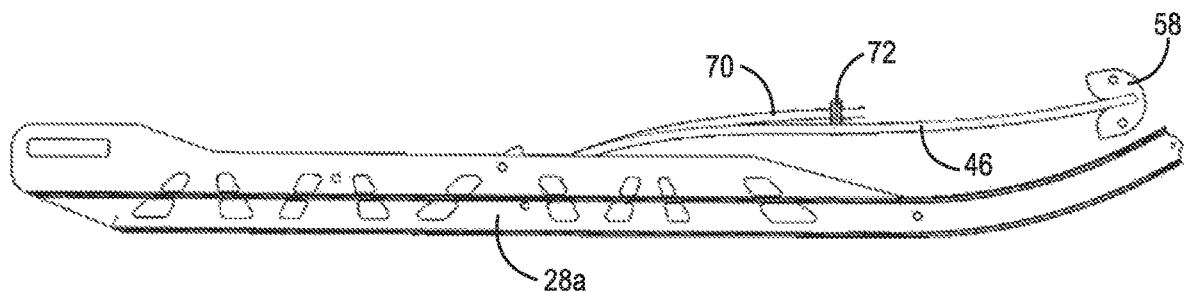
Figure 26C:
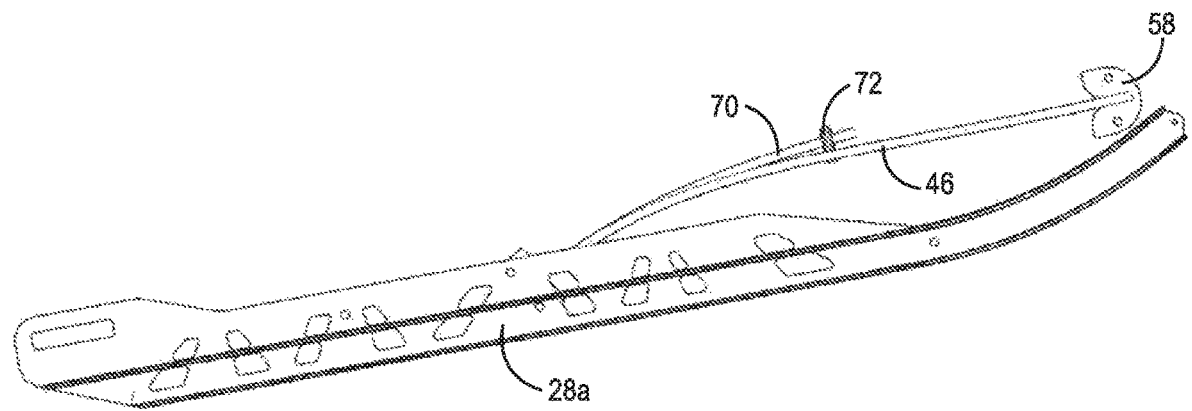

Referring now to FIGS. 25A-25C and 26A-26C, the rear suspension 30 is illustrated in various states of travel. For example, FIGS. 25A and 26A illustrate compression of the rear portion of the rear suspension 30 while the front portion is maintained in a relatively less compressed configuration, FIGS. 2513 and 26B illustrate both the front and rear portion of the rear suspension 30 in a compressed configuration, and FIGS. 25C and 26C illustrate the front portion of the rear suspension 30 in in a compressed configuration, while the rear portion is relatively uncompressed. In each example shown, the travel associated with the rear suspension 30 results in flexing of the flexible member 46 relative to tongue 70, such that in each embodiment the tongue 70 is engaged with the transition mechanism and the flexible member 46 provides a second spring rate. This is illustrated in greater detail with respect to FIGS. 26A-26C, which illustrates the travel of rear suspension 30 relative to upper shackle mount 58, which remains fixedly attached to the chassis and/or tunnel of the snowmobile. For example, in FIG. 26A the rear portion of the rear suspension travels while the front portion remains relatively unchanged (for example, in response to the rear portion of the snowmobile hitting a bump). FIG. 26B illustrates both the rear and front portions of the rear suspension 30 traveling, and FIG. 26C illustrates the front portion of the rear suspension 30 traveling while the rear portion remains relatively unchanged (for example, in response to the front portion hitting a bump). In each embodiment, the rear suspension travels and the main portion of the flexible member 46 flexes relative to the tongue 70, through at least a portion of the travel. Once tongue 70 is engaged with the transition mechanism 72, the flexible member 46 provides a second spring rate that is greater than the first spring rate provided prior to engagement of the tongue 70 with the transition mechanism 72.

Figure 27:
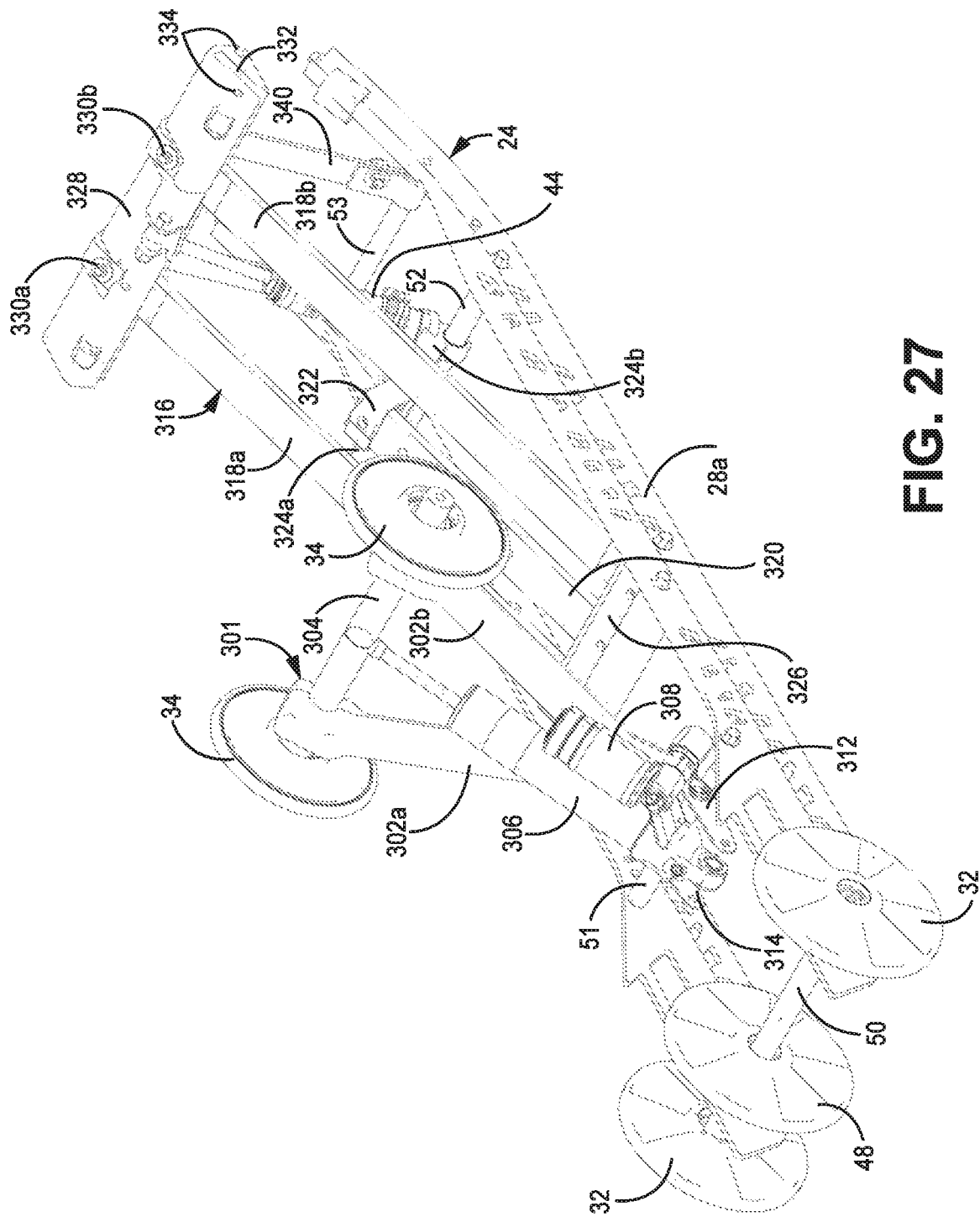
FIG. 27 is an isometric view of the skid frame according to some embodiments.
Figure 28:
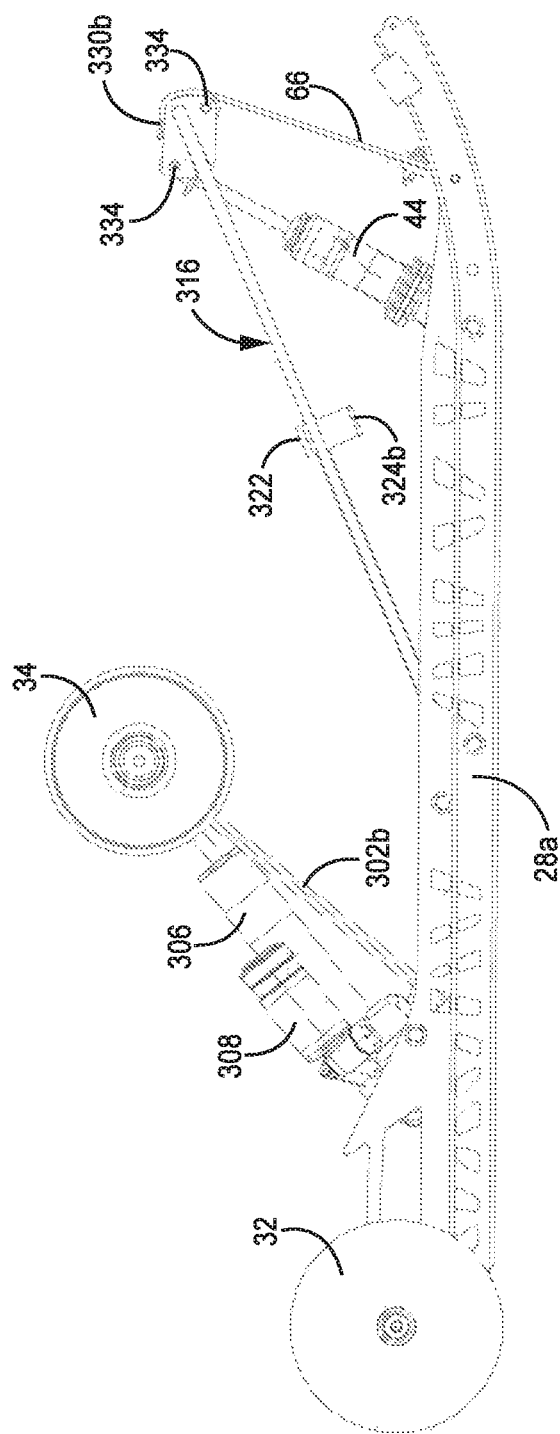
FIG. 28 is a side view of the skid frame according to some embodiments.

Referring now to FIGS. 27-30, a rear suspension 300 is shown. Certain reference numerals from the above-figures are recycled with regard to these figures. For example, skid frame 24 once again includes one or more slide rails 28a, 28b, rear idler wheel 32, and upper idle wheel 34. As discussed above, the one or more slide rails 28 are connected to the chassis 12 via rear suspension 300. In some embodiments, the one or more slide rails 28a, 28b extend longitudinally along the length of the skid frame 24. For example, in the embodiment shown in FIGS. 27-29, a pair of slide rails 28a, 28b extend longitudinally along the length of the skid frame 24, wherein the slide rails 28a, 28b are substantially parallel with one another. As shown in FIG. 27 a plurality of cross-members are connected to the pair of slide rails 28a, 28b, including rear cross member 50, first middle cross member 51, second middle cross member 52, and forward cross member 53. In some embodiments, the plurality of cross-members are connected to the slide rails 28a, 28b.

In the embodiment shown in FIG. 27, the components included as part of the rear suspension 300 include rear shock 306, structural shock link 301, flexible member 316, lower shackle mount 326, and upper shackle mount 328. In some embodiments, flexible member 316 includes first and second arms 318a and 318b and middle arm 320. In some embodiments, first and second arms 318a and 318b are fixedly connected to lower shackle mount 326 on a first end and fixedly connected to upper shackle mount 328 on a second end. In some embodiments, the first and second arms 318a and 318b are formed integrally with one or more of the lower and upper shackle mounts 326, 328. In some embodiments, middle arm 320 is fixedly connected to lower shackle mount 326 on a first end. In some embodiments, the middle arm 320 is formed integrally with the lower shackle mount 326. A transition assembly 322 is connected to middle arm 320 and includes first and second tabs 324a and 324b that extend under first and second arms 318a and 318b. During a first length of travel of the rear suspension 300, a first spring rate is provided by the arms 318a and 318b, wherein the tabs 324a and 324b of the transition assembly 322 are not in contact with the first and second arms 318a and 318b. During a second length of travel of the rear suspension 300 a second spring rate is provided as a result of first and second tabs 324a and 324b coming into contact with the bottom portion of arms 318a and 318b, resulting in middle arm 320 contributing to the spring rate. In some embodiments, rather than have middle arm 320 fixedly connected to lower shackle mount 326, middle arm 320 is fixedly connected to upper shackle mount 328. In some embodiments, more than one middle arm 320 is provided, with a first middle arm extending from lower shackle mount 326 (as shown in FIGS. 27-30) and a second middle arm extending from upper shackle mount 328 (not shown).

In some embodiments, transition assembly 322 further includes a cam assembly utilized to selectively modify the distance between first and second tabs 324a and 324b and the first and second flexible arms 318a and 318b, respectively, wherein the cam assembly is utilized to modify the transition point between the first spring rate and the second spring rate. In some embodiments, the transition assembly 322 may be fixedly secured to one or a plurality of locations along the length of the middle flexible arm 320. Changing the location of the transition assembly 322 along the length of the middle flexible arm 320 changes the second spring rate provided when the transition assembly 322 comes into contact with the first and second flexible arms 318a and 318b. In some embodiments, one or more of the transition point between the first and second spring rates and the spring rates themselves may be selectively modified.

In some embodiments, first and second flexible arms 318a and 318b are a polymer composite material that includes a fiber and resin composition selected to provide the desired stiffness, strength, and spring rate. For example, in some embodiments the first and second flexible arms are a unidirectional glass fiber within an epoxy resin matrix. In some embodiments, the unidirectional glass fiber comprises by volume between 50-70% of the composite structure. In some embodiments, the geometry of the first and second arms 318a and 318b are defined by a thickness, a width, and a length, wherein one or more of these features is varied across the geometry of the first and second arms 318a and 318b. For example, the thickness of the first and second arms 318a and 318b may vary over the length and/or width of the arms. Likewise, the width of the first and second arms 318a and 318b may vary over the length of the arms. In addition, middle arm 320 may likewise be a polymer composite material that includes a fiber and resin composition. In some embodiments, the composition of first and second arms 318a and 318b are the same as middle flexible arm 320. In some embodiments, however, the composition of middle flexible arm 320 may differ from first and second arms 318a and 318b in order to provide a desired stiffness, strength, and spring rate associated with the middle flexible arm 320.

In some embodiments, forward strap 340 is secured to a top surface of upper shackle mount 328 via fasteners 330a and 330b. In some embodiments, fasteners 330a and 330b may also be utilized to secure first and second flexible arms 318a and 318b to upper shackle mount 328. As discussed above, in some embodiments upper shackle mount 328 includes a groove 332 for receiving first and second flexible arms 318a and 318b. In some embodiments, an adhesive is utilized to secure the first and second flexible arms 318a and 318b within the groove 332. In some embodiments, fasteners 330a and 330b are utilized alone or conjunction with the adhesive to secure the first and second flexible arms 318a and 318b within the grooves 332.

Figure 29:
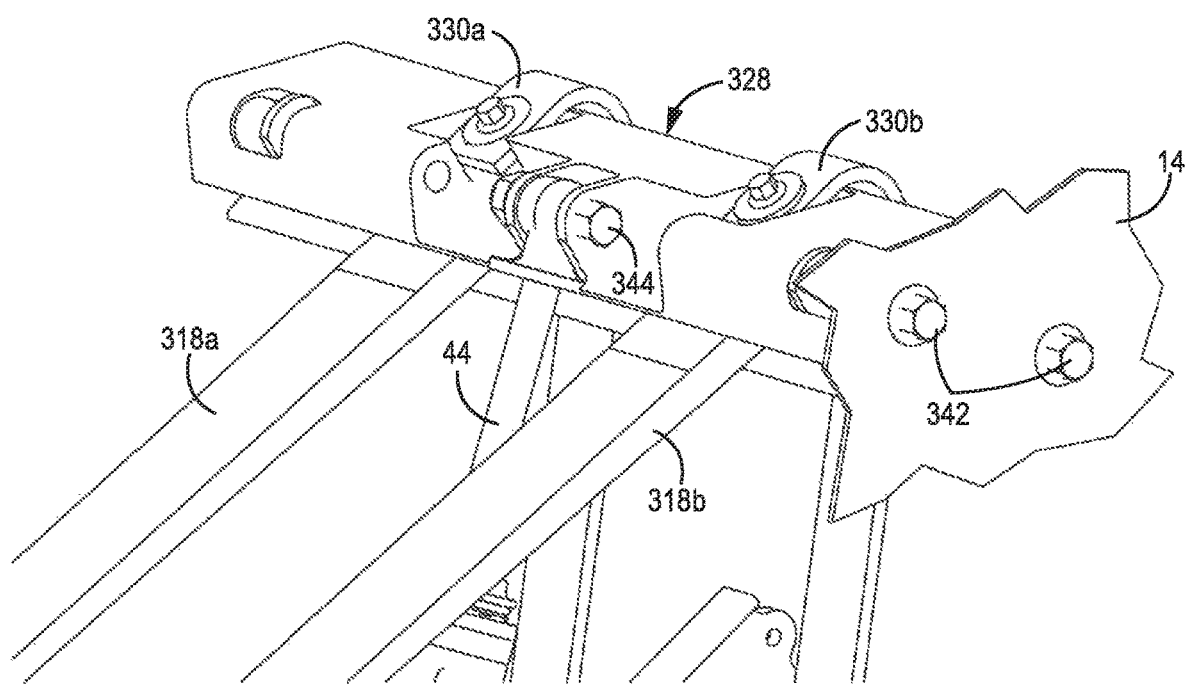
FIG. 29 is an isometric view illustrating mounting of the suspension arm to the chassis according to some embodiments.

In some embodiments, upper shackle mount 328 is fixedly secured to the tunnel 14 or chassis 12 via one or more fasteners 342 secured through bolt holes 334 located on the side of upper shackle mount 328 (as shown in FIG. 29). In some embodiments, front shock 44 is likewise secured to upper shackle mount 328 via one or more fasteners 344.

In the embodiment shown in FIG. 27, rear shock 306 is connected between rear cross-member 51 and upper cross member 304. In some embodiments, a lower shock pivot member 312 is pivotally connected to rear cross member 51. The lower shock pivot member 312 includes a rear cross member 314 that is pivotally connected to one end of rear shock 306 and a forward end that is connected to structural shock link 301. The rear shock 306 extends between the lower shock pivot member 312 and the upper cross-member 304 that is in turn connected to upper idler wheels 34.

In some embodiments, structural shock link 301 has a Y-frame geometry that includes first leg 302a and second leg 302b. The structural shock link 301 is pivotally connected to lower shock pivot member 312 on a first end and pivotally connected to upper cross-member 304 on via first leg 302a and second leg 302b. In some embodiments, structural shock link 301 is a composite that includes a fiber and resin composition selected to provide the desired stiffness and strength. For example, in some embodiments, the structural shock link 301 is a unidirectional fiber (e.g., glass fiber, carbon fiber) within an epoxy resin matrix. In some embodiments, a unidirectional glass fiber comprises by volume between 50-70% of the composite structure. In some embodiments, the unidirectional glass fiber extends generally longitudinally along the length of the structural shock link 112. In some embodiments, however, the structural shock link 112 is isotropic, for example of a homogenous fiber-resin matrix. In some embodiments, the structural shock link 301 in combination with the rear shock 306 provides a progressive damping and/or a progressive spring rate of the rear suspension. In addition, the Y-shaped geometry of structural shock link 301 allows the skid frame 24 to twist, for example as shown in FIG. 30. As discussed above, FIG. 30 is a rear view of the rear suspension 30. As shown in FIG. 30, a first plane a is defined by the orientation of the chassis 14 and a second plane is defined by the bottom of slide rails 28a and 28b. In particular, the respective slide rails 28a and 28b are allows to twist relative to one another, wherein upper cross-member 304 is fixedly connected to the chassis 12 and/or tunnel 14, resulting in the plane defined by the respective slide rails 28a, 28b being non-parallel with the plane defined by the chassis 14.

Figure 31:
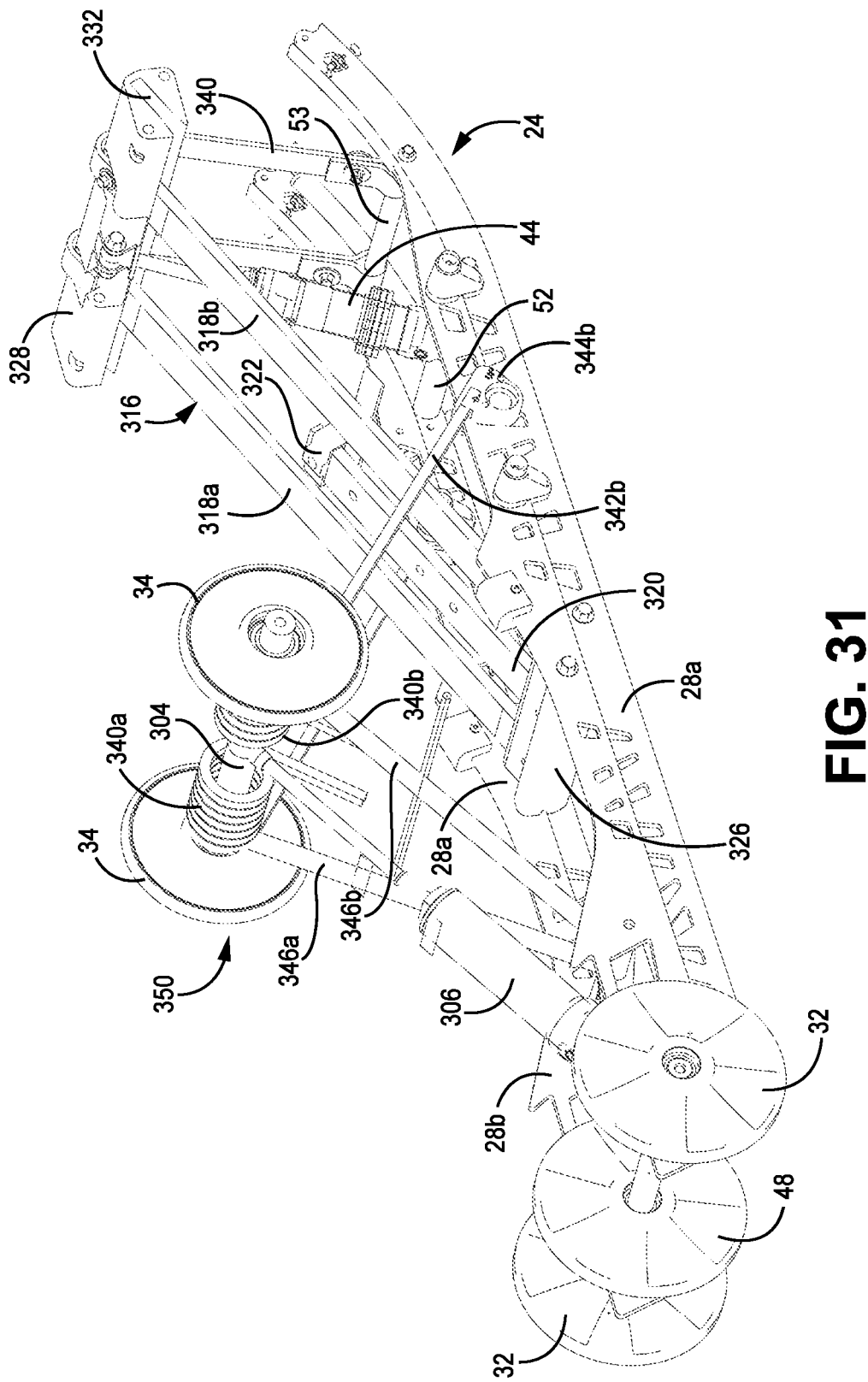
FIG. 31 is an isometric view of the skid frame according to some embodiments.

Referring now to FIG. 31, the skid frame 24 includes rear shock 306, flexible member 316, lower shackle mount 326, upper shackle mount 328, torsion springs 340a and 340b, and supports 346a and 346b. In some embodiments, torsion spring 340a and 340b are coupled to upper cross member 304 on a first end and to the slide rails 28a and 28b, respectively, on a second end. In some embodiments, torsion springs 340a and 340b contribute to the spring force applied to the slide rails 28a and 28b during travel of the skid frame. In this embodiment, rear shock 306 and support arms 346a, 346 are connected between upper cross member 304 lower cross members (not shown) of the skid frame 24.

In some embodiments, the flexible member described herein is utilized in the rear suspension to support the weight of the snowmobile, control suspension movements, control track tension, and provide a desired spring rate to the rear suspension. In particular, the utilization of one or more features such as the tongue, or arm member allows the flexible member to provide a first spring rate over a first distance of travel and a second spring rate over a second distance of travel. In some embodiments, more than two spring rates may be provided by the flexible member.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A snowmobile comprising:
  a chassis;

at least one ski steerably secured to a front of the chassis; and a skid frame having a rear suspension and one or more slide rails, wherein the rear suspension comprising:
- a flexible, composite member affixed on a first end to the one or more slide rails and on a second end to the chassis, wherein the second end is located opposite the first end and wherein the flexible, composite member includes a main body and a secondary body, wherein the secondary body includes a first tongue located along a centerline of the flexible composite member, wherein the first tongue is unattached to the main body on three sides and attached to the main body on a fourth side;
- a transition mechanism affixed to the main body and separated from the first tongue during a first length of travel of the rear suspension, wherein the transition mechanism contacts the first tongue at a transition between the first length of travel and a second length of travel and where the transition mechanism is adjustable in a longitudinal direction along a length of the tongue.

2. The snowmobile of claim 1, wherein the flexible, composite member includes a second tongue located forward of the first tongue, wherein the second tongue is unattached to the main body on three sides, and attached to the main body on a fourth side.

3. The snowmobile of claim 2, wherein the first tongue is larger in size than the second tongue, and wherein the first tongue is connected to the main body on a rear side of the first tongue and wherein the second tongue is connected to the main body on a forward side of the second tongue.

4. A snowmobile comprising:
a chassis;
at least one ski steerably secured to a front of the chassis; and
a skid frame having a rear suspension and one or more slide rails, wherein the rear suspension comprising:
- a flexible, composite member affixed on a first end to the one or more slide rails and on a second end to the chassis, wherein the second end is located opposite the first end and wherein the flexible, composite member includes a main body and a secondary body, wherein the secondary body includes a first tongue located along a centerline of the flexible, composite member, wherein the first tongue is unattached to the main body on three sides and attached to the main body on a fourth side;
- a transition mechanism affixed to the first tongue and including one or more arms separated from the main body during a first length of travel of the rear suspension, wherein the one or more arms contacts the main body at a transition between the first length of travel and the second length of travel.

5. The snowmobile of claim 4, wherein the transition mechanism is adjustable in a vertical direction to control an initial distance between the one or more arms and the main body.

6. The snowmobile of claim 4, wherein the transition mechanism includes a cam feature that includes a plurality of positions, wherein each position of the cam provides a different initial distance between the one or more arms and the main body.

7. A snowmobile comprising:
a chassis;
at least one ski steerably secured to a front of the chassis; and a skid frame that includes one or more slide rails extending longitudinally, rear idler wheels, upper idler wheels, and a rear suspension, wherein the rear suspension comprises:
- a flexible, composite member;
- a rear shock, wherein the rear shock is connected between the one or more slide rails and an upper cross member and a rear shock link that is a Y-shaped member extending between and coupling the one or more slide rails and the upper cross member;
- wherein the flexible, composite member is coupled at a first end to the one or more slide rails and at a second end to the chassis, wherein the second end is located opposite the first end and wherein the flexible, composite member includes a main body and a secondary body, wherein the rear shock link is pivotally connected to the upper cross member;
- a rear cross member connected between the one or more slide rails; and
- a lower shock pivot member pivotally connected to the rear cross member;
- wherein the rear shock is connected to a rear end of the lower shock pivot member and the Y-shaped member is connected to a forward end of the lower shock pivot member.

8. The snowmobile of claim 7, wherein the secondary body extends from the main body, wherein the secondary body is separated from the main body by an initial distance.

9. A snowmobile comprising:
a chassis;
at least one ski steerably secured to a front of the chassis; and
a skid frame that includes one or more slide rails extending longitudinally, rear idler wheels, upper idler wheels, and a rear suspension, wherein the rear suspension comprises:
- a flexible, composite member;
- a rear shock; and
- a rear shock link, wherein the flexible, composite member is coupled at a first end to the one or more slide rails and at a second end to the chassis, wherein the second end is located opposite the first end and wherein the flexible, composite member includes a main body and a secondary body;
- wherein a transition mechanism is affixed to the main body and extends over the secondary body, wherein the transition mechanism is separated from the secondary body by an initial distance.

10. The snowmobile of claim 9, wherein the transition mechanism is brought into contact with the secondary body in response to travel of the rear suspension.

11. A snowmobile comprising:
a chassis;
at least one ski steerably secured to a front of the chassis; and
a skid frame that includes one or more slide rails extending longitudinally, rear idler wheels, upper idler wheels, and a rear suspension, wherein the rear suspension comprises:
- a flexible, composite member;
- a rear shock; and
- a rear shock link, wherein the flexible, composite member is coupled at a first end to the one or more slide rails and at a second end to the chassis, wherein the second end is located opposite the first end and wherein the flexible, composite member includes a main body and a secondary body;

wherein a transition mechanism is affixed to the secondary body and includes one or more arms extending from the transition mechanism to a position beneath the main body, wherein the one or more arms are separated from the main body by an initial distance.

12. The snowmobile of claim 11, wherein the transition mechanism includes a cam feature that includes a plurality of positions, wherein each position of the cam provides a different initial distance between the one or more arms and the main body.

13. A snowmobile comprising:

a chassis;

at least one ski steerably secured to a front of the chassis; and a skid frame having a rear suspension and one or more slide rails, wherein the rear suspension comprises:

first and second flexible, composite arms affixed on a first end to the one or more skid frames and on a second end to the chassis;

a middle flexible, composite arm affixed on a first end to the skid frame;

a transition assembly affixed to the middle flexible, composite arm and including at least a first tab extending underneath one or both of the first and second flexible, composite arms, wherein the transition assembly is configured to engage with the first and second flexible, composite arms during travel of the rear suspension.

14. The snowmobile of claim 13, wherein the first and second flexible, composite arms comprise a first polymer composite material that includes a fiber and resin composition, wherein the middle flexible, composite arm comprises a second polymer composite material that includes a fiber and resin composition.

* * * * *